(12) United States Patent
Akahane et al.

(10) Patent No.: US 10,200,642 B2
(45) Date of Patent: Feb. 5, 2019

(54) CAMERA MODULE AND ELECTRONIC APPARATUS

(71) Applicants: Sony Corporation, Tokyo (JP); ROHM CO., LTD., Kyoto (JP)

(72) Inventors: Takahiro Akahane, Kanagawa (JP); Ken Koseki, Kanagawa (JP); Kenichi Shigenami, Kanagawa (JP); Go Asayama, Kanagawa (JP); Rei Takamori, Oita (JP); Tatsuya Ninomiya, Kanagawa (JP); Masato Nishinouchi, Kanagawa (JP); Masanori Onodera, Kanagawa (JP); Tatsuro Shimizu, Kanagawa (JP)

(73) Assignees: SONY CORPORATION, Tokyo (JP); ROHM CO., LTD., Kyoto (JP)

( * ) Notice: Subject to any disclaimer, the term of this patent is extended or adjusted under 35 U.S.C. 154(b) by 0 days.

(21) Appl. No.: 15/562,079

(22) PCT Filed: Mar. 1, 2016

(86) PCT No.: PCT/JP2016/056210
§ 371 (c)(1),
(2) Date: Mar. 23, 2018

(87) PCT Pub. No.: WO2016/158161
PCT Pub. Date: Oct. 6, 2016

(65) Prior Publication Data
US 2018/0220088 A1    Aug. 2, 2018

(30) Foreign Application Priority Data

Mar. 31, 2015 (JP) .................................. 2015-071430

(51) Int. Cl.
*H04N 5/357* (2011.01)
*G02B 7/04* (2006.01)
(Continued)

(52) U.S. Cl.
CPC ............. *H04N 5/3577* (2013.01); *G02B 7/04* (2013.01); *H04N 5/217* (2013.01); *H04N 5/232* (2013.01);
(Continued)

(58) Field of Classification Search
CPC ...... H04N 5/3577; H04N 5/217; H04N 5/232; H04N 5/23212; H04N 5/23296; H04N 5/3765; H04N 5/378
See application file for complete search history.

(56) References Cited

U.S. PATENT DOCUMENTS

2009/0195679 A1    8/2009 Matsumoto
2012/0008866 A1*   1/2012 Halimeh ............ G06K 9/00791
                                                      382/190
(Continued)

FOREIGN PATENT DOCUMENTS

CN    101567641 A    10/2009
EP    2088766 A      8/2009
(Continued)

OTHER PUBLICATIONS

International Search Report and Written Opinion of PCT Application No. PCT/JP2016/056210, dated Apr. 26, 2016, 10 pages of ISRWO.

*Primary Examiner* — Antoinette T Spinks
(74) *Attorney, Agent, or Firm* — Chip Law Group

(57) ABSTRACT

A camera module of the disclosure includes: an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on the basis of a difference between the first and second detection values; a lens unit including a lens and an actuator that drives the lens; and a (Continued)

driver unit that generates a drive signal and drives the actuator using the drive signal, in which the drive signal makes a transition in each of the first and third terms.

17 Claims, 19 Drawing Sheets

(51) Int. Cl.
   *H04N 5/232* (2006.01)
   *H04N 5/378* (2011.01)
   *H04N 5/217* (2011.01)
   *H04N 5/376* (2011.01)
(52) U.S. Cl.
   CPC ..... *H04N 5/23212* (2013.01); *H04N 5/23296* (2013.01); *H04N 5/378* (2013.01); *H04N 5/3765* (2013.01)

(56) References Cited

U.S. PATENT DOCUMENTS

2012/0263234 A1* 10/2012 Chang .................... H04N 19/86
                                                        375/240.14
2015/0186731 A1*  7/2015 Sun ..................... G06K 9/00744
                                                        382/103

FOREIGN PATENT DOCUMENTS

| | | |
|---|---|---|
| JP | 2009-213106 A | 9/2009 |
| JP | 2009-253556 A | 10/2009 |
| JP | 2011-091474 A | 5/2011 |
| KR | 10-2009-0086170 A | 8/2009 |

* cited by examiner

CAMERA MODULE AND ELECTRONIC APPARATUS

CROSS REFERENCE TO RELATED APPLICATIONS

This application is a U.S. National Phase of International Patent Application No. PCT/JP2016/056210 filed on Mar. 1, 2016 which claims priority benefit of Japanese Patent Application No. JP 2015-071430 filed in the Japan Patent Office on Mar. 31, 2015. Each of the above-referenced applications is hereby incorporated herein by reference in its entirety.

TECHNICAL FIELD

The disclosure relates to a camera module and an electronic apparatus including the camera module.

BACKGROUND ART

In recent years, with higher functionalization of electronic apparatuses, various electronic apparatuses are often equipped with camera modules. In the camera modules, for example, an actuator moves a lens, in order to perform automatic focusing or to make a camera shake correction. Examples of methods of driving the actuator include a direct-current drive system and an alternating-current drive system. In the alternating-current drive system, an actuator driver drives the actuator by, for example, pulse width modulation (PWM). Thus, driving the actuator by the alternating-current drive system makes it possible to reduce power consumption.

In the camera module that drives the actuator with the utilization of the alternating-current drive system, there are cases where operation of the actuator causes degradation in image quality of captured images. Various techniques have been disclosed regarding methods of reducing the degradation in the image quality. For example, PTL 1 discloses an imaging device that controls operation timing of the actuator driver, on the basis of read timing of an imaging element.

CITATION LIST

Patent Literature

PTL 1: Japanese Unexamined Patent Application Publication No. 2009-213106

SUMMARY OF THE INVENTION

As described, in the camera module, higher image quality as well as lower power consumption are desired, with expectation of further enhancement in the image quality.

It is therefore desirable to provide a camera module and an electronic apparatus that make it possible to enhance image quality while reducing power consumption.

A first camera module according to an embodiment of the disclosure includes an imaging unit, a lens unit, and a driver unit. The imaging unit includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on the basis of a difference between the first detection value and the second detection value. The lens unit includes a lens and an actuator that drives the lens. The driver unit generates a drive signal and drives the actuator using the drive signal, in which the drive signal makes a transition in each of the first term and the third term.

A second camera module according to an embodiment of the disclosure includes an imaging unit and a driver unit. The imaging unit includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on the basis of a difference between the first detection value and the second detection value. The driver unit generates a drive signal and supplies the drive signal to an actuator that drives a lens, in which the drive signal makes a transition in each of the first term and the third term.

An electronic apparatus according to an embodiment of the disclosure includes the first camera module as mentioned above. Examples include a digital camera, a smartphone, a tablet, and a camcorder.

In the first camera module, the second camera module, and the electronic apparatus according to the embodiments of the disclosure, in the second term, the first detection value in one of the pixels is acquired. In the fourth term, the second detection value of the relevant one of the pixels is acquired. On the basis of the difference between the first detection value and the second detection value, the pixel value of the relevant one of the pixels is obtained. Moreover, in the driver unit, generated is the drive signal to be supplied to the actuator that drives the lens. The drive signal makes the transition in each of the first term and the third term.

According to the first camera module, the second camera module, and the electronic apparatus of the embodiments of the disclosure, utilized is the drive signal that makes the transition in each of the first term and the third term. Hence, it is possible to enhance the image quality while reducing the power consumption. It is to be noted that effects of the disclosure are not necessarily limited to the effects described above, and may include any of effects that are described herein.

MODES FOR CARRYING OUT THE INVENTION

Figure 1:
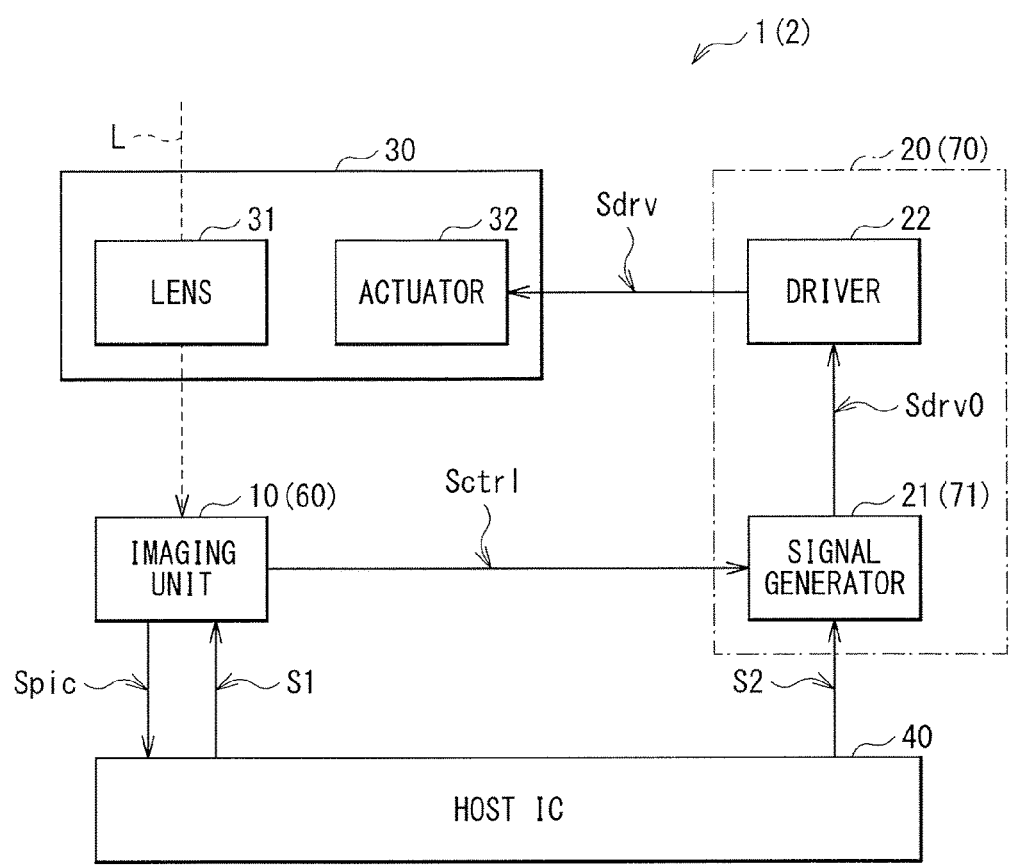
FIG. 1 is a block diagram that illustrates one configuration example of a camera module according to one embodiment of the disclosure.

In the following, some embodiments of the disclosure are described in detail with reference to the drawings. It is to be noted that description is made in the following order.
1. First Embodiment
2. Second Embodiment
3. Application Examples 1. First Embodiment Configuration Example FIG. 1 illustrates one configuration example of a camera module (a camera module 1) according to a first embodiment. The camera module 1 performs imaging by performing correlated double sampling (CDS). The camera module 1 includes a lens unit 30, an imaging unit 10, a driver unit 20, and a host IC 40.

The lens unit 30 includes a lens 31 and an actuator 32. The lens 31 causes convergence or divergence of light L, and is so constituted as to include, for example, one or more lenses. In the camera module 1, the light L enters the imaging unit 10 through the lens 31. The actuator 32 moves the lens 31 along an optical axis, on the basis of a drive signal Sdrv, at the time of automatic focusing operation of the camera module 1. For example, the actuator 32 is so constituted as to include a coil, whereas the lens 31 is so constituted as to include a magnet that interacts with a magnetic field generated by the coil. With this configuration, in the lens unit 30, the coil of the actuator 32 generates the magnetic field on the basis of the drive signal Sdrv, allowing for movement of the lens 31.

The imaging unit 10 performs imaging operation. Specifically, the imaging unit 10 performs the imaging operation on the basis of an imaging control signal S1 supplied from the host IC 40, and supplies the host IC 40 with captured images acquired, as an image signal Spic. Moreover, the imaging unit 10 also has a function of generating a drive control signal Sctrl, and supplying the drive control signal Sctrl to the driver unit 20.

Figure 2:
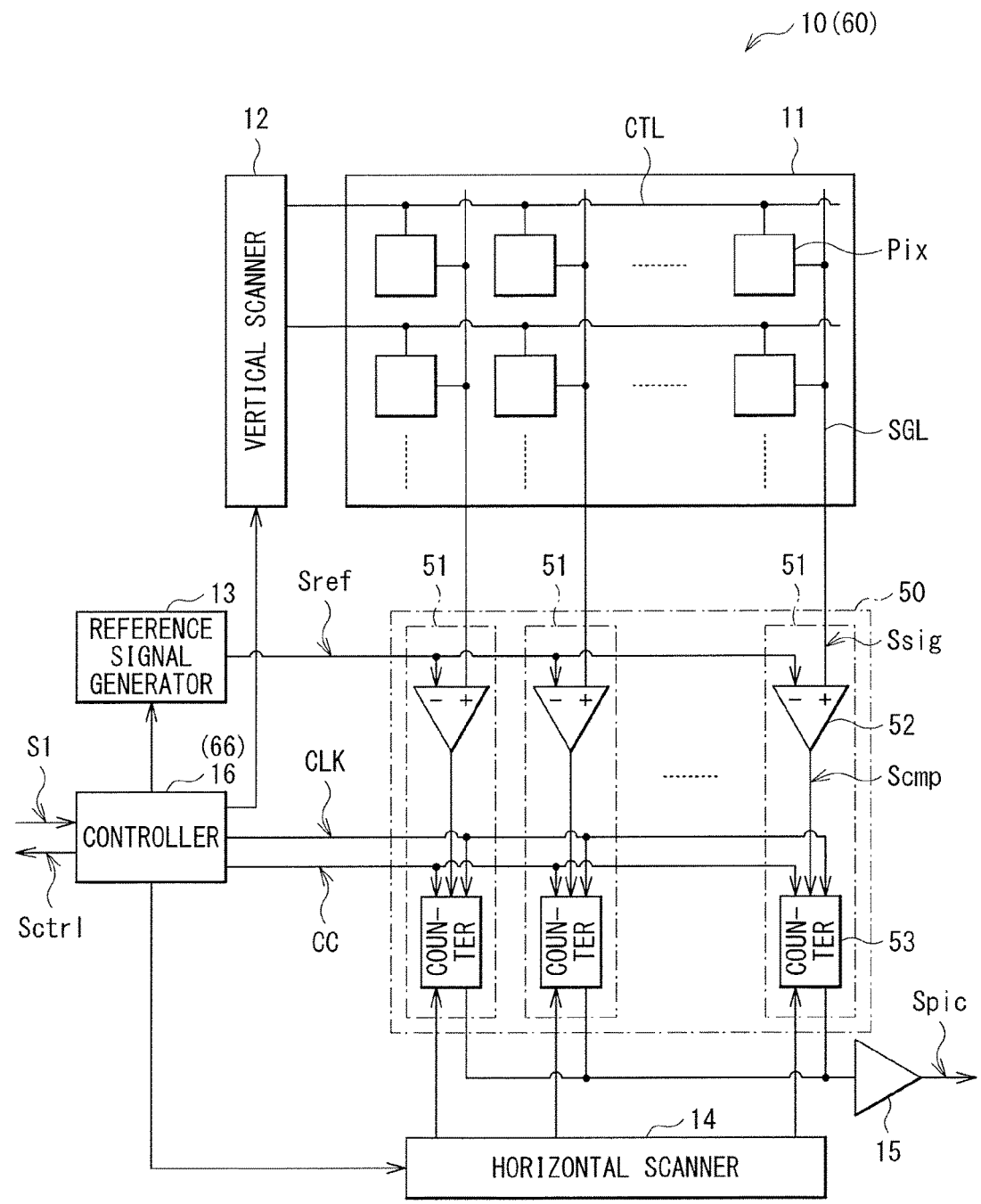
FIG. 2 is a block diagram that illustrates one configuration example of an imaging unit illustrated in FIG. 1.

FIG. 2 illustrates one configuration example of the imaging unit 10. The imaging unit 10 includes a pixel array 11, a vertical scanner 12, a reference signal generator 13, an AD (Analog to Digital) converter unit 50, a horizontal scanner 14, an output buffer 15, and a controller 16.

The pixel array 11 includes a plurality of pixels Pix that are arranged in a matrix. The pixel Pix is so constituted as to include, for example, a photodiode, and outputs a signal having magnitude corresponding to an amount of light received. The pixel array 11 includes a plurality of control lines CTL and a plurality of signal lines SGL. The plurality of the control lines CTL extend in a row direction (a horizontal direction). The plurality of the signal lines SGL extend in a column direction (a vertical direction). One end of the control line CTL is coupled to the vertical scanner 12. One end of the signal line SGL is coupled to the AD converter unit 50. The pixels Pix are disposed at respective intersections of the control lines CTL and the signal lines SGL.

The pixels Pix each perform light-receiving operation, signal outputting operation, and reset operation, on the basis of a control signal supplied from the vertical scanner 12 through the control line CTL. The light-receiving operation includes receiving light, and accumulating, in the pixel Pix, charges corresponding to the amount of the light received. The signal outputting operation includes outputting, through the signal line SGL, a signal corresponding to the charges accumulated, as a signal Ssig. The reset operation includes resetting the charges accumulated in the pixel Pix.

In the imaging unit 10, as described later, the pixels Pix each output the signal Ssig, in order to acquire a pixel value PV in each of the pixels Pix. The signal Ssig includes two voltages Vreset and Vsig. Specifically, first, the pixel Pix outputs the voltage Vreset in the signal outputting operation (a P phase (Pre-charge phase) term TP) after the reset operation. Moreover, thereafter, the pixel Pix performs the light-receiving operation, and thereafter, outputs the voltage Vsig in the signal outputting operation (a D phase (Data phase) term TD).

The vertical scanner 12 sequentially selects pixel lines, in the pixel array 11, on the basis of a control signal supplied from the controller 16, and performs a control to allow each of the pixels Pix to perform the reset operation, the light receiving operation, and the signal outputting operation.

The reference signal generator 13 generates a reference signal Sref. In this example, the reference signal Sref has a so-called ramp waveform in which a voltage level gradually lowers with passage of time, in the P phase term TP and the D phase term TD. The reference signal generator 13 generates the reference signal Sref as described above, and supplies the reference signal Sref to the AD converter unit 50.

The AD converter unit 50 performs AD conversion on the basis of the signal Ssig supplied from the pixel array 11. The AD converter unit 50 includes a plurality of converter circuits 51. In this example, the converter circuits 51 are provided in association with the respective signal lines SGL. It is to be noted that this is non-limiting. For example, the converter circuits 51 may be provided at a rate of one per the plurality of the signal lines SGL, and the converter circuits 51 may operate time-divisionally. Each of the converter circuits 51 includes a comparator 52 and a counter 53.

The comparator 52 makes a comparison of an input voltage at a positive input terminal with an input voltage at a negative input terminal, and outputs a result of the comparison as a signal Scmp. The positive input terminal of the comparator 52 is coupled to an associated one of the signal lines SGL, and supplied with the signal Ssig that includes the voltages Vreset and Vsig. Moreover, the negative input terminal of the comparator 52 is supplied with the reference signal Sref.

The counter 53 performs count-up operation or count-down operation, on the basis of the signal Scmp, and on the basis of a control signal CC and a clock signal CLK that are supplied from the controller 16. Specifically, as described later, in the P phase term TP, the counter 53 starts the count-down operation on the basis of the control signal CC supplied from the controller 16, and suspends the count-down operation on the basis of the output signal Scmp of the comparator 52. Moreover, in the D phase term TD, the counter 53 starts the count-up operation on the basis of the control signal CC supplied from the controller 16, and suspends the count-up operation on the basis of the output signal Scmp of the comparator 52. Furthermore, after the D phase term TD, the counter 53 supplies a final count value to the output buffer 15, on the basis of a control signal supplied from the horizontal scanner 14.

With this configuration, in the imaging unit 10, as described later, the voltage Vsig is subjected to the AD conversion, whereas the voltage Vreset is subjected to the AD conversion. On the basis of a difference between results of the AD conversion, acquired is the pixel value PV of the relevant pixel Pix. In the imaging unit 10, performing the correlated double sampling as described above makes it possible to remove a noise component included in the voltage Vsig. As a result, in the camera module 1, it is possible to enhance image quality.

The horizontal scanner 14 performs a control, on the basis of the control signal supplied from the controller 16, to allow the converter circuits 51 of the AD converter unit 50 to sequentially output their respective count values.

The output buffer 15 outputs the count values, as the image signal Spic. The count values are sequentially supplied from the respective converter circuits 51.

The controller 16 controls operation of the imaging unit 10. Specifically, on the basis of the imaging control signal S1, the controller 16 generates the clock signal CLK and the control signal CC, and supplies them to the AD converter unit 50, while controlling operation in each of the vertical scanner 12, the reference signal generator 13, and the horizontal scanner 14.

Moreover, the controller 16 also has the function of generating the drive control signal Sctrl. The drive control signal Sctrl is a signal that indicates whether or not to permit the drive signal Sdrv to make a transition. Specifically, in this example, with the drive control signal Sctrl being a high level, indicated is permission of the transition of the drive signal Sdrv. With the drive control signal Sctrl being a low level, indicated is prohibition of the transition of the drive signal Sdrv. In this example, the controller 16 allows the drive control signal Sctrl to be the low level in the P phase term TP and the D phase term TD. In other terms, the controller 16 allows the drive control signal Sctrl to be the high level.

The driver unit 20 (FIG. 1) generates the drive signal Sdrv, on the basis of a lens control signal S2, and on the basis of the drive control signal Sctrl. The lens control signal S2 is supplied from the host IC 40. The drive control signal Sctrl is supplied from the imaging unit 10. The driver unit 20 includes a signal generator 21 and a driver 22.

The signal generator 21 generates a signal Sdrv0 on the basis of the lens control signal S2 and on the basis of the drive control signal Sctrl. At this occasion, the signal generator 21 determines a duty ratio DR of the signal Sdrv0 on the basis of the lens control signal S2, and determines transition timing of the signal Sdrv0 on the basis of the drive control signal Sctrl. Specifically, the signal generator 21 determines the transition timing of the signal Sdrv0, so as to allow the transition of the signal Sdrv0 to occur in a term during which the drive control signal Sctrl is the high level.

The driver 22 generates the drive signal Sdrv on the basis of the signal Sdrv0, and drives the actuator 32 using the drive signal Sdrv. In other wods, the drive signal Sdrv corresponds to the signal Sdrv0, and is a signal having the same duty ratio DR as the signal Sdrv0.

The host IC 40 controls operation of the camera module 1. Specifically, the host IC 40 supplies the imaging unit 10 with the imaging control signal S1, and supplies the driver unit 20 with the lens control signal S2. Moreover, the host IC 40 also has a function of receiving the image signal Spic from the imaging unit 10, and performing predetermined image processing on the basis of the image signal Spic.

[Operation and Workings]

Description is given next of operation and workings of the camera module 1 according to this embodiment.

[Outline of Overall Operation]

First, description is given of an outline of overall operation of the camera module 1, with reference to FIG. 1. The imaging unit 10 performs the imaging operation on the basis of the imaging control signal S1, and outputs the captured images acquired, as the image signal Spic, while generating the drive control signal Sctrl. The driver unit 20 generates the drive signal Sdrv on the basis of the lens control signal S2 and on the basis of the drive control signal Sctrl. At this occasion, the driver unit 20 determines the duty ratio DR of the drive signal Sdrv on the basis of the lens control signal S2, and determines the transition timing of the drive signal Sdrv on the basis of the drive control signal Sctrl. The actuator 32 of the lens unit 30 moves the lens 31 along the optical axis on the basis of the drive signal Sdrv.

[Operation of Imaging Unit 10]

Next, detailed description is given of operation of acquisition of the pixel value PV of the pixel Pix of concern in the imaging unit 10.

Figure 3:
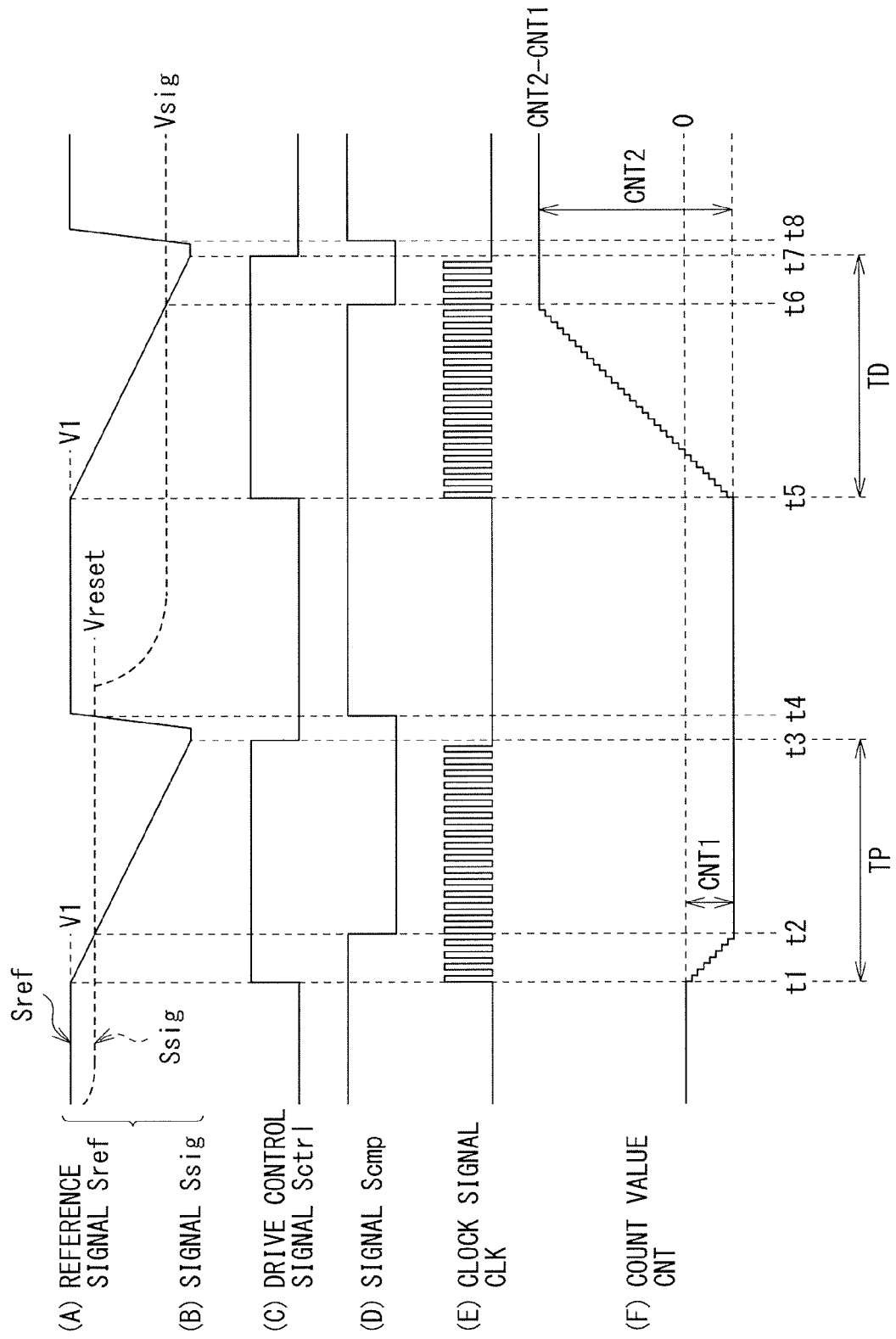
FIGS. 3(A), 3(B), 3(C), 3(D), 3(E) and 3(F) are timing waveform charts that illustrates one operation example of the imaging unit illustrated in FIG. 1.

FIGS. 3(A), 3(B), 3(C), 3(D), 3(E) and 3(F) illustrates one operation example of the imaging unit 10, with FIG. 3(A) indicating a waveform of the reference signal Sref, with FIG. 3(B) indicating a waveform of the signal Ssig, with FIG. 3(C) indicating a waveform of the drive control signal Sctrl, with FIG. 3(D) indicating a waveform of the signal Scmp, with FIG. 3(E) indicating a waveform of the clock signal CLK, and with FIG. 3(F) indicating a count value CNT in the counter 53. Here, FIGS. 3(A) and 3(B) indicates the waveforms of the respective signals along the same voltage axis.

In the imaging unit 10, first, in the P phase term TP, the converter circuit 51 of the AD converter unit 50 performs the AD conversion on the basis of the voltage Vreset outputted from the pixel Pix. Moreover, thereafter, in the D phase term TD, the converter circuit 51 performs the AD conversion on the basis of the voltage Vsig outputted from the pixel Pix. Furthermore, the imaging unit 10 generates the drive control signal Sctrl that is the low level in the P phase term TP and the D phase term TD, and is the high level in the other terms. In the following, this operation is described in detail.

First, prior to timing t1, the pixel Pix performs the reset operation on the basis of the control signal supplied from the vertical scanner 12, and thereafter, outputs the voltage Vreset, as the signal Ssig.

Thereafter, in a term of the timing t1 to t3 (the P phase term TP), the converter circuit 51 of the AD converter unit 50 performs the AD conversion on the basis of the voltage Vreset. Specifically, first at the timing t1, the controller 16 changes a voltage of the drive control signal Sctrl from the low level to the high level ( FIG. 3(C)), and starts generation of the clock signal CLK (FIG. 3(E)). At the same time, the reference signal generator 13 starts, on the basis of the control signal supplied from the controller 16, to allow a voltage of the reference signal Sref to lower from a voltage V1 at a predetermined degree of change (FIG. 3(A)). In response thereto, after this, the counter 53 performs the count-down operation, to sequentially lower the count value CNT (FIG. 3(F)).

Moreover, at timing t2, the voltage of the reference signal Sref becomes lower than the voltage Vreset of the signal Ssig FIGS. 3(A) and 3(B)). In response thereto, the comparator 52 changes a voltage of the output signal Scmp from the high level to the low level (FIG. 3(D)). As a result, the counter 53 suspends the count-down operation (FIG. 3(F)). In this way, the converter circuit 51 converts the voltage Vreset to a digital value (a count value CNT1).

Thereafter, at the timing t3, the controller 16 changes the voltage of the drive control signal Sctrl from the low level to the high level FIG. 3(C)), and suspends the generation of the clock signal CLK FIG. 3(E)). At the same time, on the basis of the control signal supplied from the controller 16, the reference signal generator 13 suspends the change in the voltage of the reference signal Sref, and thereafter, restores the voltage of the reference signal Sref to the voltage V1 (FIG. 3(A)). At this occasion, at timing t4, the voltage of the reference signal Sref becomes higher than the voltage Vreset of the signal Ssig (FIGS. 3(A) and 3(B)). In response thereto, the comparator 52 changes the voltage of the output signal Scmp from the low level to the high level (FIG. 3(D)).

Thereafter, the pixel Pix performs the light-receiving operation on the basis of the control signal supplied from the vertical scanner 12, and thereafter, outputs the voltage Vsig as the signal Ssig.

Thereafter, in a term of timing t5 to t7 (the D phase term TD), the converter circuit 51 of the AD converter unit 50 performs the AD conversion on the basis of the voltage Vsig. Specifically, first, at the timing t5, the controller 16 changes the voltage of the drive control signal Sctrl from the high level to the low level (FIG. 3(C)), and starts the generation of the clock signal CLK (FIG. 3(E)). At the same time, the reference signal generator 13 starts, on the basis of the control signal supplied from the controller 16, to allow the voltage of the reference signal Sref to lower from the voltage V1 at the predetermined degree of change (FIG. 3(A)). In response thereto, after this, the counter 53 performs the count-up operation, to sequentially increase the count value CNT (FIG. 3(F)).

Moreover, at timing t6, the voltage of the reference signal Sref becomes lower than the voltage Vsig of the signal Ssig (FIGS. 3(A) and 3(B)). In response thereto, the comparator 52 changes the voltage of the output signal Scmp from the high level to the low level (FIG. 3(D)). As a result, the counter 53 suspends the count-up operation (FIG. 3(F)). In this way, the converter circuit 51 converts the voltage Vsig to a digital value (a count value CNT2).

Thereafter, at the timing t7, the controller 16 changes the voltage of the drive control signal Sctrl from the low level to the high level (FIG. 3(C)), and suspends the generation of the clock signal CLK (FIG. 3(E)). At the same time, on the basis of the control signal supplied from the controller 16, the reference signal generator 13 suspends the change in the voltage of the reference signal Sref, and thereafter, restores the voltage of the reference signal Sref to the voltage V1 (FIG. 3(A)). At this occasion, at timing t8, the voltage of the reference signal Sref becomes higher than the voltage Vsig of the signal Ssig (FIGS. 3(A) and 3(B)). In response thereto, the comparator 52 changes the voltage of the output signal Scmp from the low level to the high level (FIG. 3(D)).

Moreover, after this, the counter 53 outputs the count value CNT (CNT2−CNT1), on the basis of the control signal supplied from the horizontal scanner 14. The output buffer 15 outputs the count value CNT as the image signal Spic.

As described, in the imaging unit 10, the voltage Vreset is subjected to the AD conversion to acquire the digital value (the count value CNT1), whereas the voltage Vsig is subjected to the AD conversion to acquire the digital value (the count value CNT2). Thus, the difference (CNT2−CNT1) between the digital values is acquired. In the imaging unit 10, performing the correlated double sampling as described above makes it possible to remove the noise component included in the voltage Vsig. In other words, in the camera module 1, there is possibility of occurrences of various noises such as a noise that occurs in each of the pixels Pix and a noise caused by operation of the actuator 32 (described later). At this occasion, the voltage Vreset includes the noise component, whereas the voltage Vsig includes the noise component and a signal component. Accordingly, acquiring the pixel value PV on the basis of a difference between a result of the AD conversion of the voltage Vsig and a result of the AD conversion of the voltage Vreset makes it possible to remove the noise component included in the voltage Vsig, for each of the pixels Pix. Hence, in the camera module 1, it is possible to enhance the image quality.

Moreover, in the imaging unit 10, provided is the counter 53 that performs the count-down operation and the count-up operation. Accordingly, it is unnecessary to provide, for example, a calculator that obtains the difference between the two count values CNT1 and CNT2. Hence, it is possible to simplify a circuit configuration.

[Operation of Driver Unit 20]

As illustrated in FIG. 3(C), the controller 16 of the imaging unit 10 generates the drive control signal Sctrl that is the low level in the P phase term TP and the D phase term TD, and is the high level in the other terms. The driver unit 20 generates the drive signal Sdrv on the basis of the drive control signal Sctrl and on the basis of the lens control signal S2, and drives the actuator 32 of the lens unit 30. At this occasion, the driver unit 20 determines the duty ratio DR of the drive signal Sdrv on the basis of the lens control signal S2, and determines the transition timing of the drive signal Sdrv on the basis of the drive control signal Sctrl. In the following, detailed description is given of operation of the driver unit 20 in a case where the drive control signal Sctrl has a rectangular waveform with the duty ratio of 40%.

Figure 4:
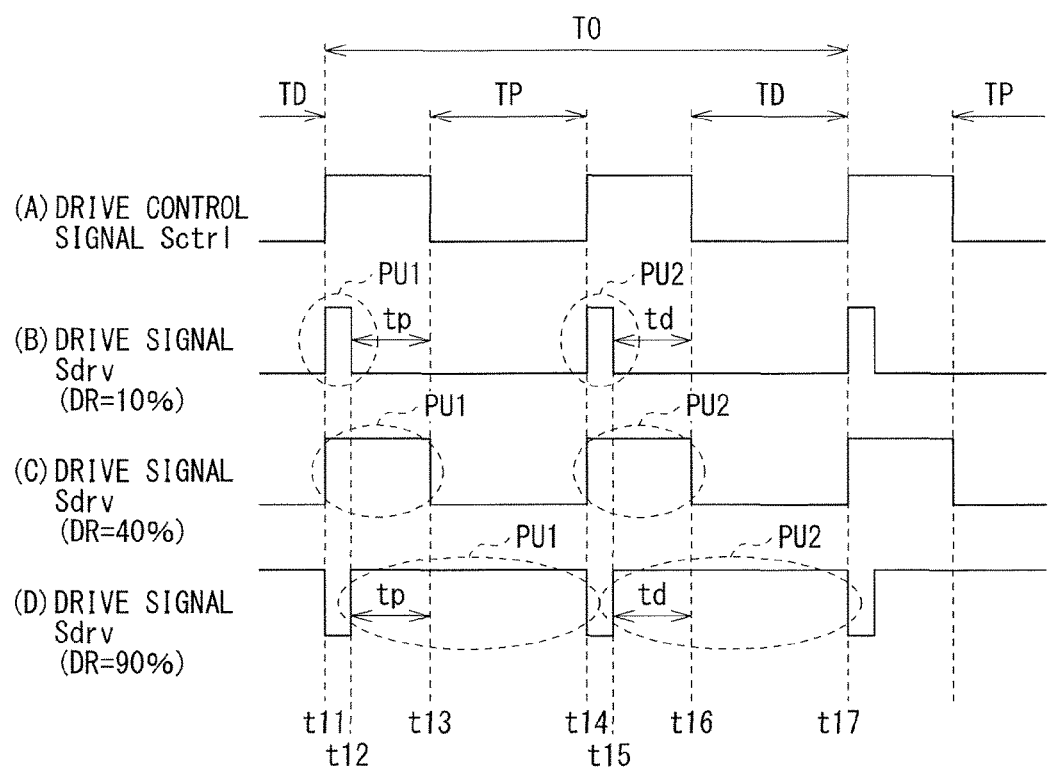
FIGS. 4(A), 4(B), 4(C) and 4(D) are timing waveform charts that illustrates one operation example of a driver unit according to a first embodiment.
Figure 5:
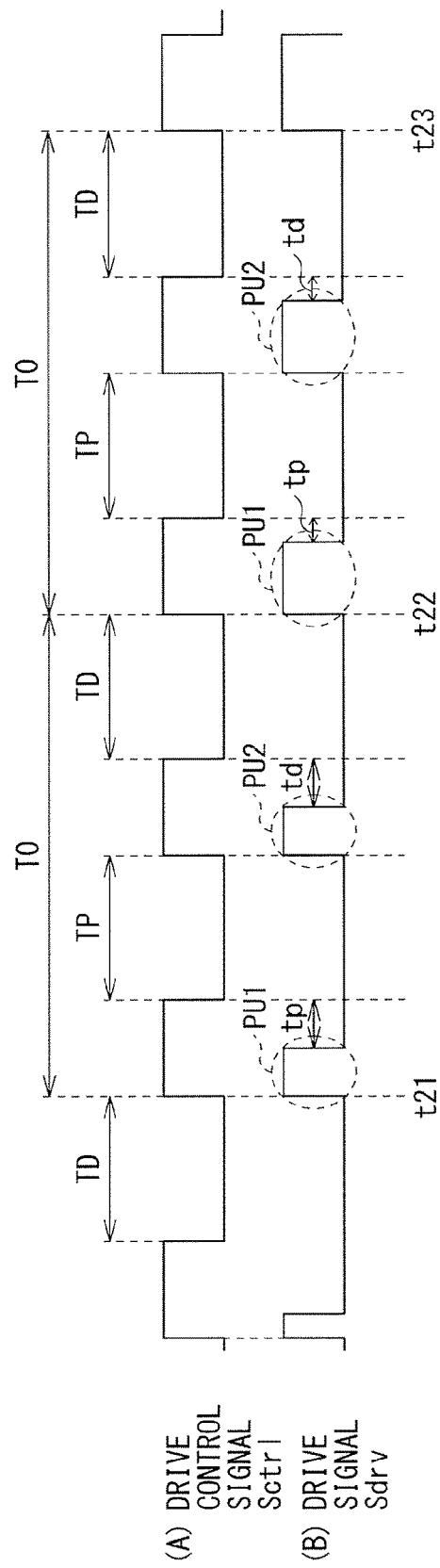
FIGS. 5(A) and 5(B) are another timing waveform charts that illustrates one operation example of the driver unit according to the first embodiment.

FIGS. 4(A), 4(B), 4(C) and 4(D) illustrates one operation example of the driver unit 20, with FIG. 4(A) indicating the waveform of the drive control signal Sctrl, with FIG. 4(B) indicating the waveform of the drive signal Sdrv with the duty ratio DR of 10%, with FIG. 4(C) indicating the waveform of the drive signal Sdrv with the duty ratio DR of 40%, and with FIG. 4(D) indicating the waveform of the drive signal Sdrv with the duty ratio DR of 90%. FIGS. 5(A) and 5(B) illustrates one operation example of the driver unit 20 in a case where the duty ratio DR changes, with FIG. 5(A) indicating the waveform of the drive control signal Sctrl, and with FIG. 5(B) indicating the waveform of the drive signal Sdrv.

As illustrated in (FIG. 4(A), the imaging unit 10 allows the drive control signal Sctrl to be the high level in a term of timing t11 to t13, and allows the drive control signal Sctrl to be the low level in a term of the timing t13 to t14 (the P phase term TP). Moreover, the imaging unit 10 allows the drive control signal Sctrl to be the high level in a term of the timing t14 to t16, and allows the drive control signal Sctrl to be the low level in a term of the timing t16 to t17 (the D phase term TD). The imaging unit 10 repeats the operation in a term of the timing t11 to t17 (a term T0). In this example, with the duty ratio of the drive control signal Sctrl being 40%, a time width of the term of the timing t11 to t13 and a time width of the term of the timing t14 to t16 are equal to each other. A time width of the term of the timing t13 to t14 (the P phase term TP) and a time width of the term of the timing t16 to t17 (the D phase term TD) are equal to each other. In other words, in this example, intervals between the P phase terms TP and the D phase terms TD are equal to one another.

Moreover, the driver unit 20 determines the duty ratio DR of the drive signal Sdrv on the basis of the lens control signal S2, and generates the drive signal Sdrv (FIGS. 4(B), 4(C) and 4(D)). At this occasion, the driver unit 20 determines the transition timing, so as to allow the transition of the drive signal Sdrv to occur in a term during which the drive control signal Sctrl is the high level. In other words, the driver unit 20 determines the transition timing, so as not to allow the drive signal Sdrv to make the transition in the P phase term TP and the D phase term TD, but to allow the drive signal Sdrv to make the transition in the other terms.

Specifically, for example, with the duty ratio DR of the drive signal Sdrv being 10%, as illustrated in FIG. 4(B), the driver unit 20 allows the voltage of the drive signal Sdrv to change from the low level to the high level at the timing t11, and to change from the high level to the low level at timing t12. Here, the duty ratio DR is a ratio of time when the voltage of the drive signal Sdrv is the high level, in a term of the timing t11 to t14. Moreover, the driver unit 20 allows the voltage of the drive signal Sdrv to change from the low level to the high level at the timing t14, and to change from the high level to the low level at timing t15. At this occasion, in the P phase term TP and the D phase term TD, the voltage of the drive signal Sdrv keeps the low level. As described, the driver unit 20 generates, in the term T0, two pulses having equal pulse widths to each other, namely, a pulse PU1 (the timing t11 to t12) and a pulse PU2 (the timing t14 to t15).

Moreover, for example, with the duty ratio DR of the drive signal Sdrv being 40%, as illustrated in FIG. 4(C), the driver unit 20 allows the voltage of the drive signal Sdrv to change from the low level to the high level at the timing t11, to change from the high level to the low level at the timing t13, to change from the low level to the high level at the timing t14, and to change from the high level to the low level at the timing t16. At this occasion, in the P phase term TP and the D phase term TD, the voltage of the drive signal Sdrv keeps the low level. As described, the driver unit 20 generates, in the term T0, the two pulses having the equal pulse widths to each other, namely, the pulse PU1 (the timing t11 to t13) and the pulse PU2 (the timing t14 to t16).

Moreover, for example, with the duty ratio DR of the drive signal Sdrv being 90%, as illustrated in (FIG. 4(D), the driver unit 20 allows the voltage of the drive signal Sdrv to change from the low level to the high level at the timing t12, to change from the high level to the low level at the timing t14, to change from the low level to the high level at the timing t15, and to change from the high level to the low level at the timing t17. At this occasion, in the P phase term TP and the D phase term TD, the voltage of the drive signal Sdrv keeps the high level. As described, the driver unit 20 generates, in the term T0, the two pulses having the equal pulse widths to each other, namely, the pulse PU1 (the timing t12 to t14) and the pulse PU2 (the timing t15 to t17).

Moreover, with the duty ratio DR of the drive signal Sdrv being changed, as illustrated in FIGS. 5(A) and 5(B), the driver unit 20 sets the duty ratio DR for each term T0. In other words, the driver unit 20 generates the two pulses PU1 and PU2 having the equal pulse widths to each other in a term of timing t21 to t22 (the term T0), thereafter changes the duty ratio DR, and generates the two pulses PU1 and PU2 having the equal pulse widths to each other in a subsequent term of the timing t22 to t23 (the term T0).

As described, in the camera module 1, the drive signal Sdrv makes the transition in the term of the timing t11 to t13 before the P phase term TP, and the drive signal Sdrv makes the transition in the term of the timing t14 to t16 before the D phase term TD. At this occasion, in the camera module 1, the pulse widths of the two pulses PU1 and PU2 in the term T0 are equal to each other, and time tp and time td are equal to each other. The time tp is time from last transition timing of the drive signal Sdrv before the P phase term TP to timing of a start of the P phase term TP. The time td is time from last transition timing of the drive signal Sdrv before the D phase term TD to timing of a start of the D phase term TD. Hence, as described below, it is possible to reduce possibility that the image quality lowers because of the drive signal Sdrv.

Figure 6:
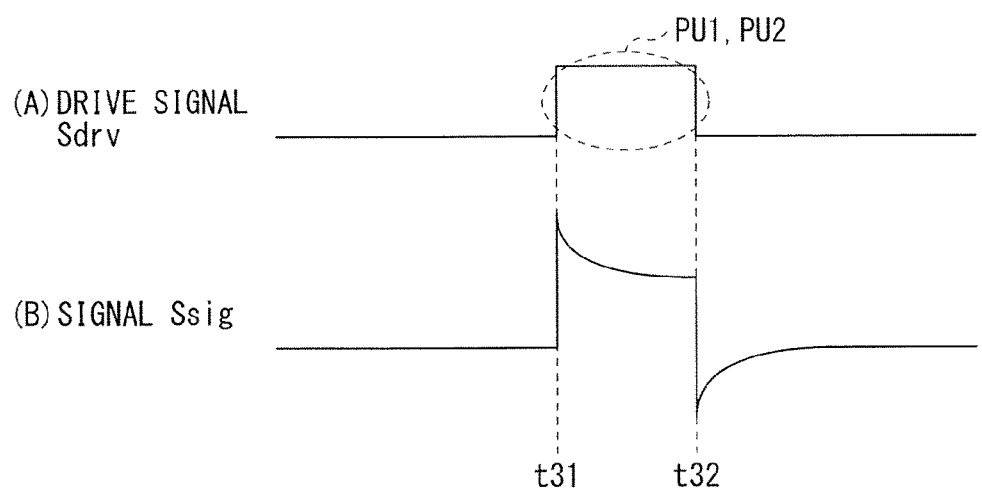
FIGS. 6(A) and 6(B) are timing waveform charts that illustrates one operation example of the camera module illustrated in FIG. 1.
Figure 7:
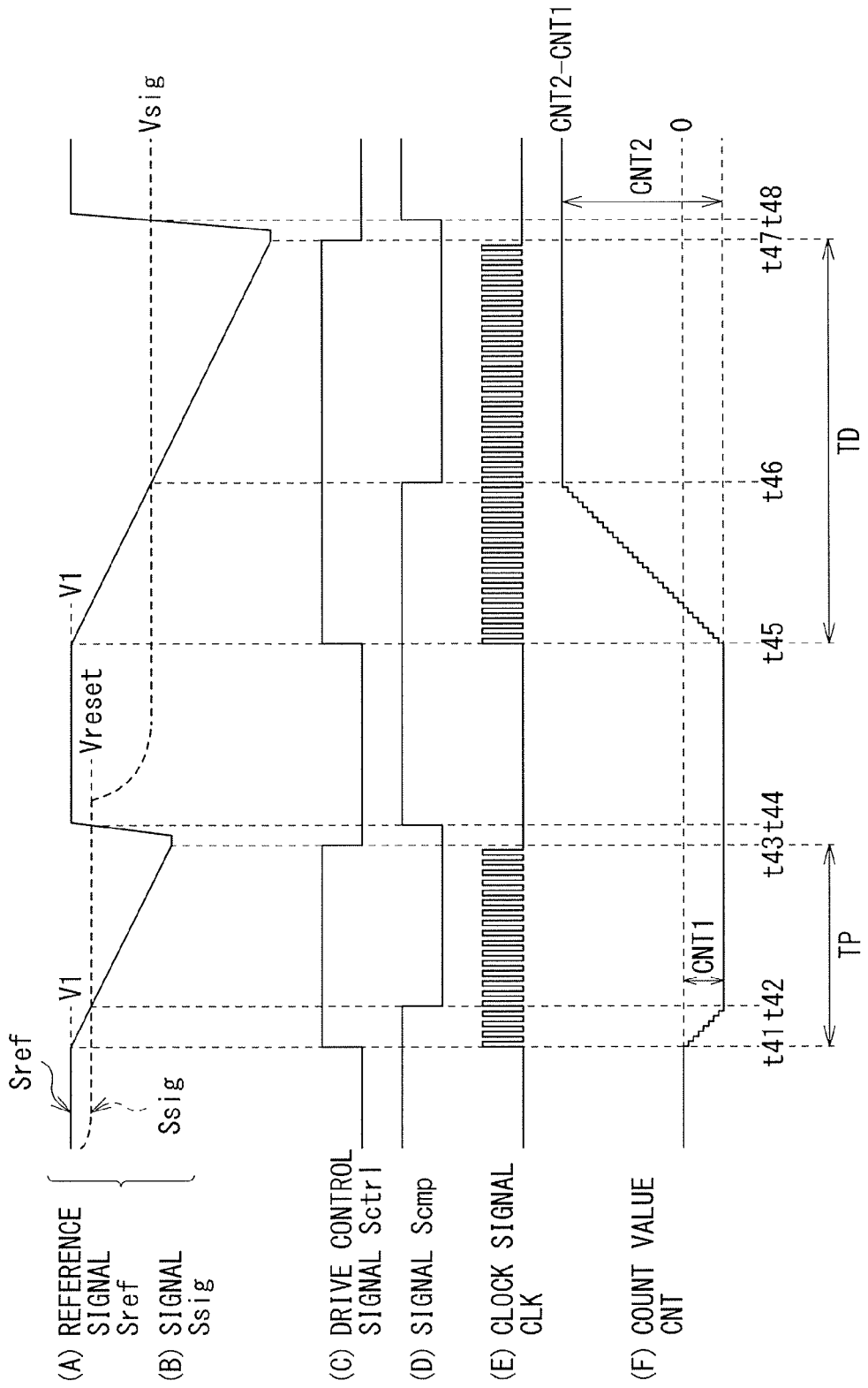
FIGS. 7(A), 7(B), 7(C), 7(D), 7(E) and 7(F) are timing waveform charts that illustrates one operation example of an imaging unit according to a modification example of the first embodiment.
Figure 8:
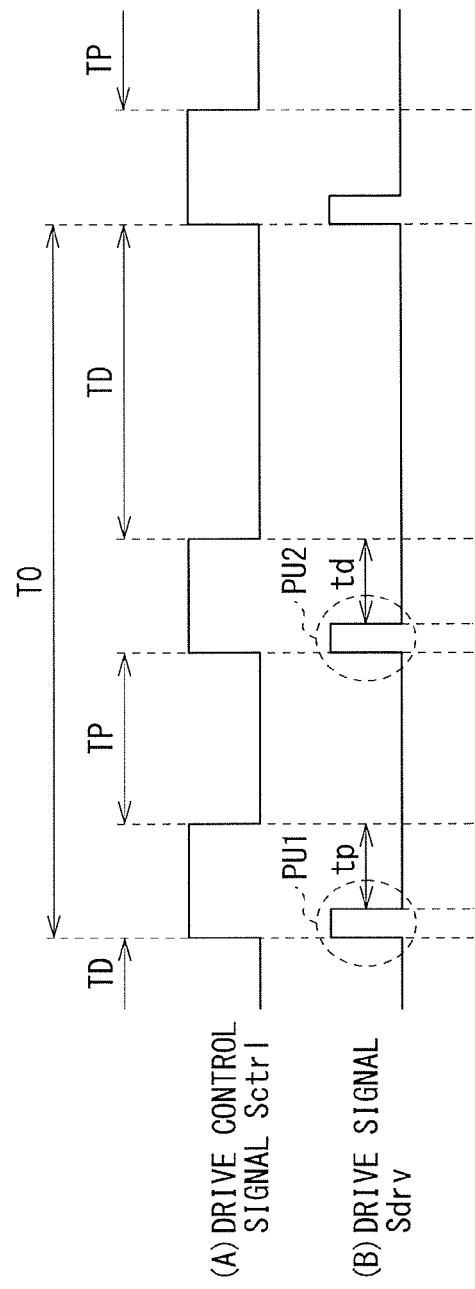
FIGS. 8(A) and 8(B) are timing waveform charts that illustrates one operation example of a driver unit including the imaging unit illustrated in FIGS. 7(A), 7(B), 7(C), 7(D), 7(E) and 7(F).

FIGS. 6(A) and 6(B) illustrates one operation example of the imaging unit 10, with FIG. 6(A) indicating the waveform of the drive signal Sdrv, and with FIG. 6(B) indicating the waveform of the signal Ssig at one of the signal lines SGL. With the drive signal Sdrv being supplied to the actuator 32, the coil of the actuator 32 generates the magnetic field, trying to move the lens 31. At this occasion, the magnetic field generated by the coil of the actuator 32 leaks into the pixel array 11 of the imaging unit 10, causing possibility that, for example, induced electromotive force is produced in the signal line SGL. In this example, at timing t31, upon the voltage of the drive signal Sdrv changing from the low level to the high level, produced is the induced electromotive force in the signal line SGL. This causes, in this example, the voltage of the signal Ssig to rise temporarily, and thereafter to fall gradually. Moreover, at timing t32, upon the voltage of the drive signal Sdrv changing from the high level to the low level, produced is the induced electromotive force in the signal line SGL. This causes the voltage of the signal Ssig to temporarily fall, and thereafter to rise gradually to converge to a desired voltage. In this way, there is possibility of an occurrence of a noise in the signal Ssig because of the pulses PU1 and PU2 of the drive signal Sdrv (FIG. 6(B)).

Accordingly, in the P phase term TP after the pulse PU1, performing the AD conversion on the basis of the voltage Vreset before the signal Ssig sufficiently converges causes the result of the AD conversion (the count value CNT1) to include the noise component. Likewise, in the D phase term TD after the pulse PU2, performing the AD conversion on the basis of the voltage Vsig before the signal Ssig sufficiently converges causes the result of the AD conversion (the count value CNT2) to include the noise component. However, in the camera module 1, the pulse PU1 is generated before the P phase term TP, whereas the pulse PU2 is generated before the D phase term TD. Thus, the correlated double sampling is performed. Hence, it is possible to reduce influences of the noise.

In other words, for example, if the pulse were generated solely before the P phase term TP, with no pulse being generated before the D phase term TD, the count value CNT1 would include a noise component caused by the pulse of the drive signal Sdrv, whereas the count value CNT2 would not include such a noise component. Accordingly, the difference (CNT2−CNT1) between the counted values CNT1 and CNT2 would include the noise component included in the count value CNT1 as it is. In contrast, in the camera module 1, the pulse PU1 is generated before the P phase term TP, whereas the pulse PU2 is generated before the D phase term TD. This allows each of the count values CNT1 and CNT2 to include the noise component caused by the pulses of the drive signal Sdrv. Hence, it is possible to reduce the noise component in the difference (CNT2−CNT1) between the count values CNT1 and CNT2. As a result, in the camera module 1, it is possible to enhance the image quality.

In particular, in the camera module 1, the time tp and the time td are equal to each other. The time tp is the time from the last transition timing of the drive signal Sdrv before the P phase term TP to the timing of the start of the P phase term TP. The time td is the time from the last transition timing of the drive signal Sdrv before the D phase term TD to the timing of the start of the D phase term TD. This makes it possible to allow the noise component included in the count value CNT1 and the noise component included in the count value CNT2 to be level with each other. Accordingly, obtaining the difference (CNT2−CNT1) between the count values CNT1 and CNT2 makes it possible to remove the influences of the noise component caused by the transition of the drive signal Sdrv. As a result, in the camera module 1, it is possible to enhance the image quality.

[Effects]

As described, in this embodiment, the pulse of the drive signal is generated before the P phase term, whereas the pulse of the drive signal is generated before the D phase term. Hence, it is possible to enhance the image quality.

In this embodiment, the time from the last transition timing of the drive signal before the P phase term to the timing of the start of the P phase term, and the time from the last transition timing of the drive signal before the D phase term to the timing of the start of the D phase term are equal to each other. Hence, it is possible to enhance the image quality.

Modification Example 1-1

The forgoing embodiment includes allowing the time width of the P phase term TP and the time width of the D phase term TD to be equal. However, this is non-limiting. In one alternative, for example, as illustrated in FIGS. 7(A), 7(B), 7(C), 7(D), 7(E), 7(F), 8(A) and 8(B), the time width of the P phase term TP may be smaller than the time width of the D phase term TD. In other words, in general, the count value CNT1 in the P phase term TP is smaller than the count value CNT2 in the D phase term TD. It is therefore possible to allow the time width of the P phase term TP to be smaller than the time width of the D phase term TD, as described above.

Modification Example 1-2

In the forgoing embodiment, the counter 53 selectively performs the count-up operation or the count-down operation. However, this is non-limiting. In what follows, an imaging unit 10B according to this modification example is described in detail.

Figure 9:
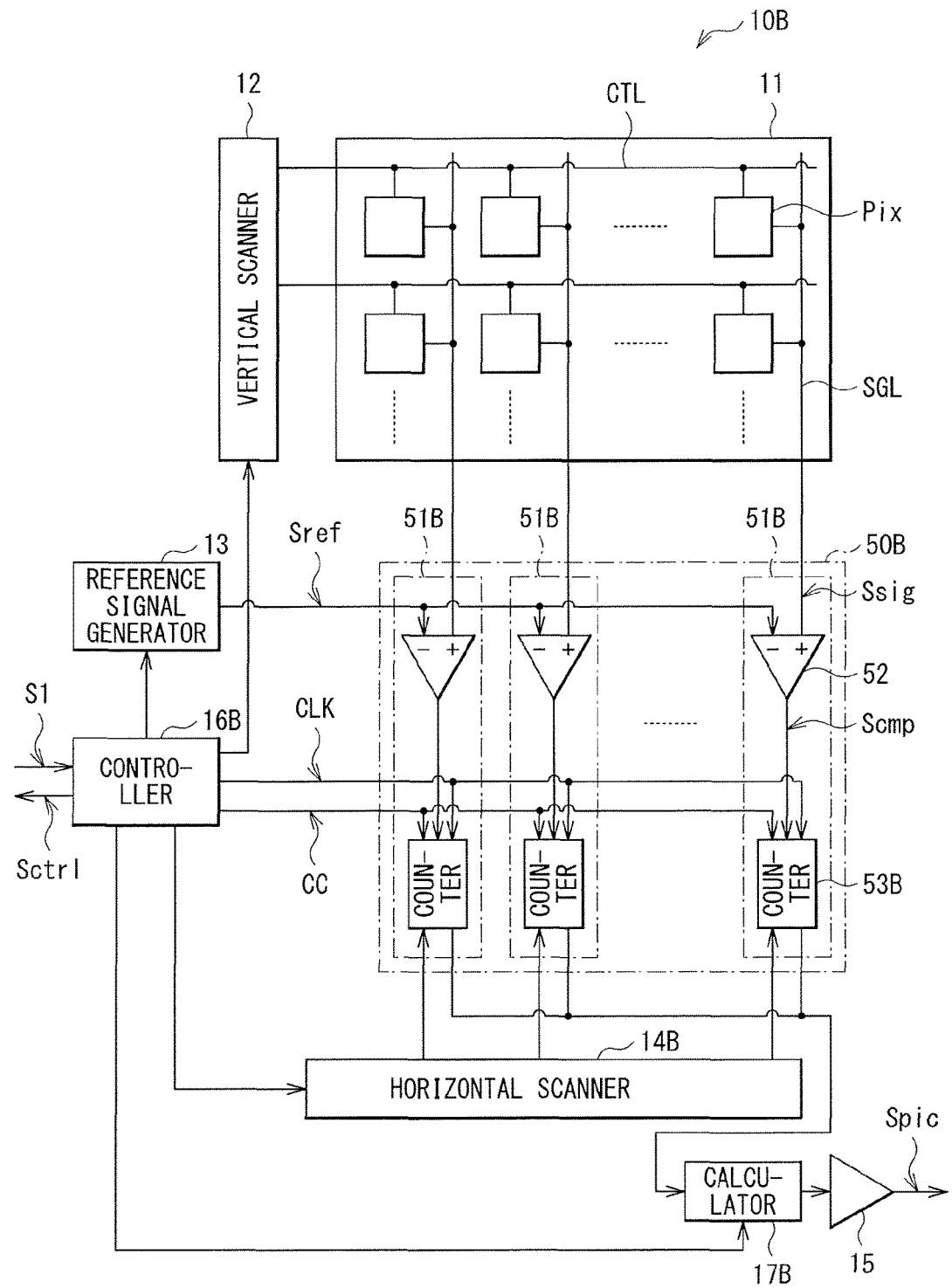
FIG. 9 is a block diagram that illustrates one configuration example of an imaging unit according to another modification example of the first embodiment.

FIG. 9 illustrates one configuration example of the imaging unit 10B. The imaging unit 10B includes an AD converter unit 50B, a horizontal scanner 14B, a calculator 17B, and a controller 16B.

The AD converter unit 50B includes a plurality of converter circuits 51B. Each of the converter circuits 51B includes a counter 53B. The counter 53B performs the count-up operation on the basis of the control signal CC and on the basis of the clock signal CLK. Specifically, in the P phase term TP, the counter 53B starts the count-up operation on the basis of the control signal CC, and suspends the count-up operation on the basis of the output signal Scmp of the comparator 52. Moreover, after the P phase term TP, the counter 53B supplies a count value to the calculator 17B on the basis of a control signal supplied from the horizontal scanner 14B. Likewise, in the D phase term TD, the counter 53B starts the count-up operation on the basis of the control signal CC, and suspends the count-up operation on the basis of the output signal Scmp of the comparator 52. Moreover, after the D phase term TD, the counter 53B supplies a count value to the calculator 17B on the basis of the control signal supplied from the horizontal scanner 14B.

The horizontal scanner 14B performs a control, on the basis of a control signal supplied from the controller 16B, to allow the converter circuits 51B of the AD converter unit 50B to sequentially output their respective count values.

The calculator 17B obtains a difference between the count value in the P phase term TP and the count value in the D phase term TD that are supplied from each of the converter circuits 51B. Moreover, the output buffer 15 outputs a calculation result in the calculator 17B, as the image signal Spic.

The controller 16B controls operation of the imaging unit 10B and generates the drive control signal Sctrl, as with the controller 16 according to the forgoing embodiment.

Figure 10:
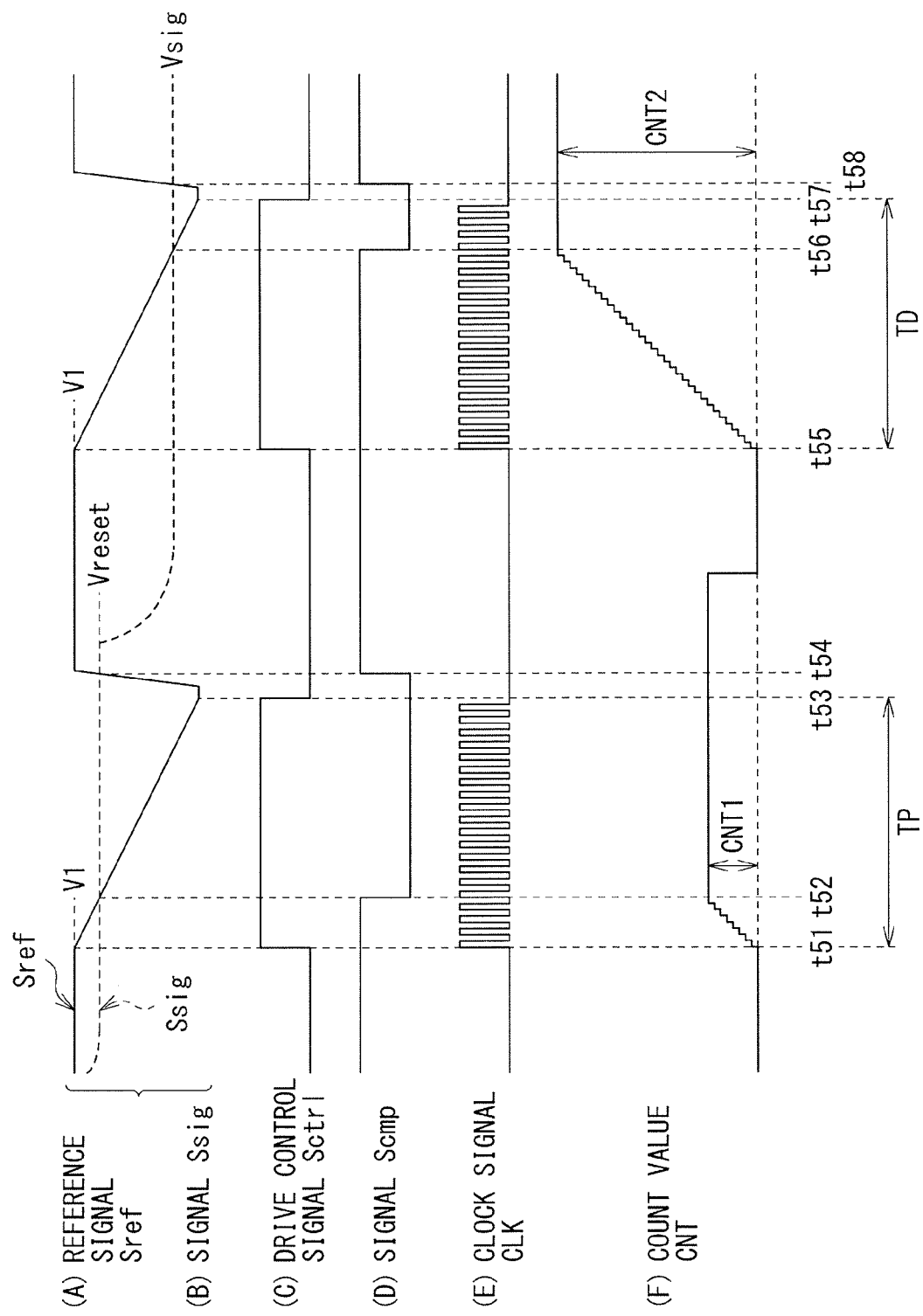
FIGS. 10(A), 10(B), 10(C), 10(D), 10(E) and 10(F) are timing waveform charts that illustrates one operation example of an imaging unit according to another modification example of the first embodiment.
Figure 11:
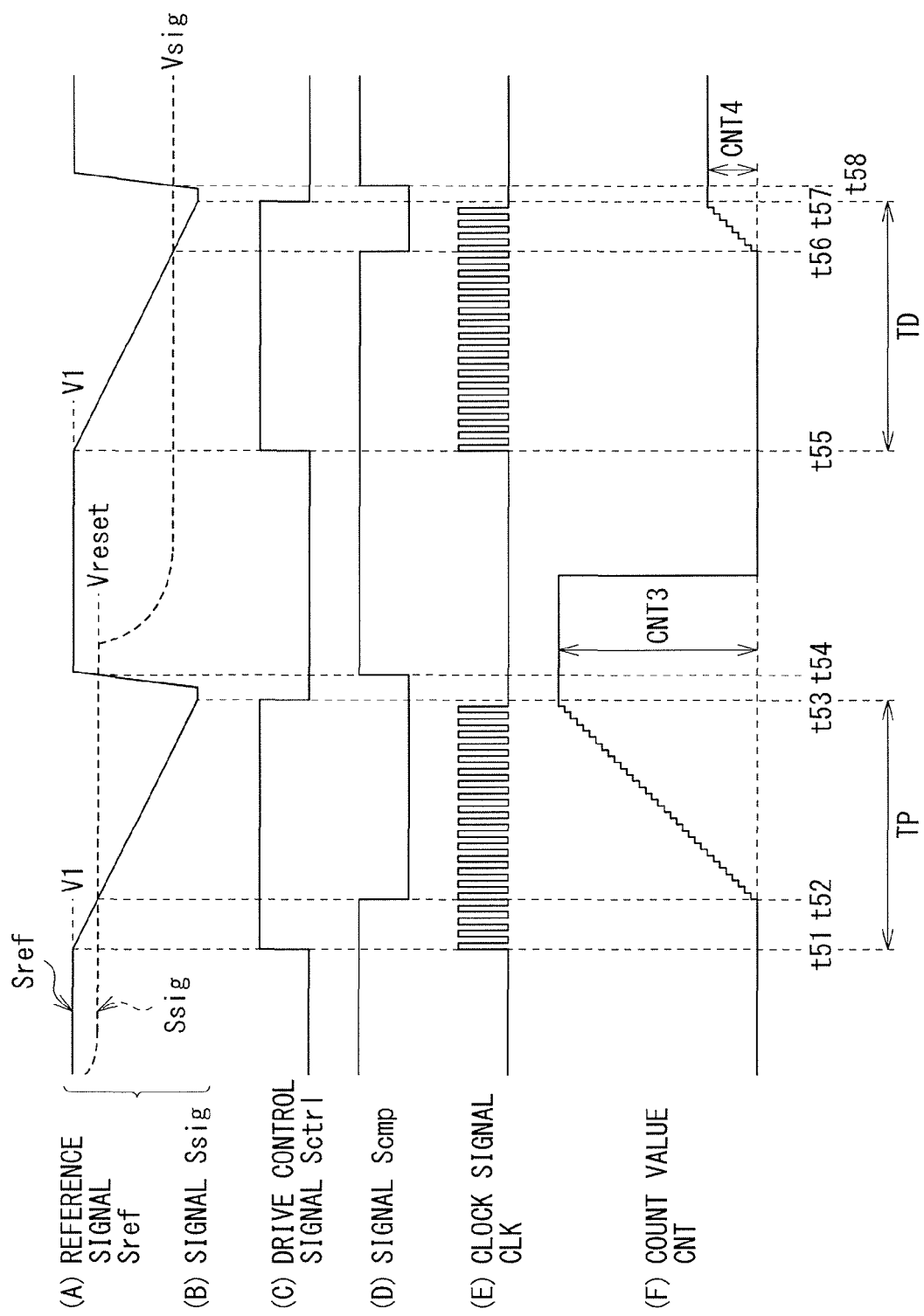
FIGS. 11(A), 11(B), 11(C), 11(D), 11(E) and 11(F) are timing waveform charts that illustrates one operation example of an imaging unit according to another modification example of the first embodiment.

FIGS. 10(A), 10(B), 10(C), 10(D), 10(E) and 10(F) illustrates one operation example of the imaging unit 10B, with FIG. 10(A) indicating the waveform of the reference signal Sref, with FIG. 10(B) indicating the waveform of the signal Ssig, with FIG. 10(C) indicating the waveform of the drive control signal Sctrl, with FIG. 10(D) indicating the waveform of the signal Scmp, with FIG. 10(E) indicating the waveform of the clock signal CLK, and with FIG. 10(F) indicating the count value CNT in the counter 53B.

In a term of timing t51 to t53 (the P phase term TP), the converter circuit 51B performs the AD conversion on the basis of the voltage Vreset. This operation is similar to the operation (FIGS. 3(A), 3(B), 3(C), 3(D), 3(E) and 3(F)) in the term of the timing t1 to t3 of the converter circuit 51 according to the forgoing embodiment. At this occasion, unlike the case of the forgoing embodiment, the counter 53B performs the count-up operation (FIG. 10(F)). Thus, the converter circuit 51B converts the voltage Vreset to the digital value (the count value CNT1). Moreover, thereafter, the counter 53B outputs the count value CNT1 on the basis of the control signal supplied from the horizontal scanner 14B. The calculator 17B temporarily stores the count value CNT1. Moreover, the counter 53B resets the count value on the basis of the control signal supplied from the controller 16B.

Thereafter, in a term of timing t55 to t57 (the D phase term TD), the converter circuit 51B of the AD converter unit 50B performs the AD conversion on the basis of the voltage Vsig. This operation is similar to the AD conversion based on the voltage Vreset in the term of the timing t51 to t53 (the P phase term TP). As a result, the converter circuit 51B converts the voltage Vsig to the digital value (the count value CNT2). Moreover, thereafter, the counter 53B outputs the count value CNT2 on the basis of the control signal supplied from the horizontal scanner 14B. Moreover, the calculator 17B obtains the difference (CNT2−CNT1) between the count value CNT2 and the count value CNT1 stored, and outputs the calculation result. Furthermore, the output buffer 15 outputs the calculation result, as the image signal Spic.

With this configuration as well, it is possible to produce similar effects to those of the imaging unit 10 according to the forgoing embodiment.

Moreover, in this example, as illustrated in FIGS. 10(A), 10(B), 10(C), 10(D), 10(E) and 10(F), the counter 53B of the converter circuit 51B counts the clock signal CLK from the timing t51 of the start of the P phase term TP to timing t52 at which the signal Scmp makes a transition, to acquire the count value CNT1, and counts the clock signal CLK from the timing t55 of the start of the D phase term TD to the timing t56 at which the signal Scmp makes the transition, to acquire the count value CNT2. The pixel value PV is obtained on the basis of these count values CNT1 and CNT2. However, this is non-limiting. In one alternative, for example, as illustrated in FIGS. 11(A), 11(B), 11(C), 11(D), 11(E) and 11(F), the counter 53B may count the clock signal CLK from the timing t52 at which the signal Scmp makes the transition to the timing t53 of an end of the P phase term TP, to acquire a count value CNT3, and count the clock signal CLK from the timing t56 at which the signal Scmp makes the transition to the timing t57 of an end of the D phase term TD, to acquire a count value CNT4. The pixel value PV may be obtained on the basis of these count values CNT3 and CNT4.

Modification Example 1-3

Figure 12:
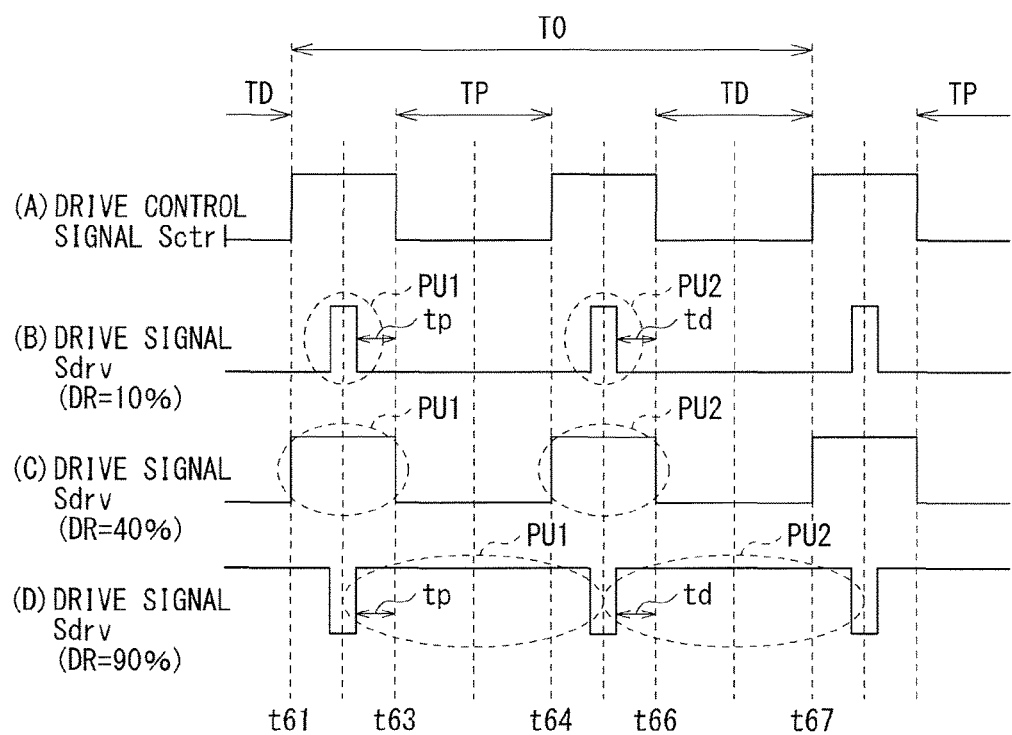
FIGS. 12(A), 12(B), 12(C) and 12(D) are timing waveform charts that illustrates one operation example of a driver unit according to another modification example of the first embodiment.

In the forgoing embodiment, for example, as illustrated in FIGS. 4(A), 4(B), 4(C) and 4(D), the drive signal Sdrv makes the transition at timing of the end of the P phase term TP (e.g., the timing t14) and at timing of the end of the D phase term TD (e.g., the timing t11 and t17). However, this is non-limiting. For example, as illustrated in FIGS. 12(B) and 12(C), with the duty ratio DR being a small value, timing of a middle of the pulse PU1 may be adjusted to timing of a middle of a term of timing t61 to t63, whereas timing of a middle of the pulse PU2 may be adjusted to timing of a middle of a term of timing t64 to t66 (FIGS. 12(B) and 12(C)). With the duty ratio DR being a large value, as illustrated in FIG. 12(D), the timing of the middle of the pulse PU1 may be adjusted to timing of a middle of a term of the timing t63 to t64 (the P phase term TP), whereas the timing of the middle of the pulse PU2 may be adjusted to timing of a middle of a term of the timing t66 to t67 (the D phase term TD) (FIG. 12(D)). In this case as well, it is possible to allow the time tp and the time td to be equal to each other. The time tp is the time from the last transition timing of the drive signal Sdrv before the P phase term TP to the timing of the start of the P phase term TP. The time td is the time from the last transition timing of the drive signal Sdrv before the D phase term TD to the timing of the start of the D phase term TD. Hence, it is possible to enhance the image quality.

Modification Example 1-4

In the forgoing embodiment, the duty ratio of the drive control signal Sctrl is 40%, but this is non-limiting. In the following, as one example, described are details of operation in a case where the duty ratio of the drive control signal Sctrl is 59%, in the camera module according to the modification example 1-3.

FIGS. 13(A), 13(B), 13(C), 13(D), 13(E), 13(F) and 13(G) illustrates one operation example of a driver unit 20D in a camera module 1D according to this modification example, with (A) indicating the waveform of the drive control signal Sctrl, and with FIGS. 13(B), 13(C), 13(D), 13(E), 13(F) and 13(G) indicating the waveforms of the drive signal Sdrv. FIGS. 13(B), 13(C), 13(D), 13(E), 13(F) and 13(G) respectively indicate cases where the duty ratio DR of the drive signal Sdrv is varied, on the basis of the lens control signal S2, in the following order: 10%, 59%, 60%, 90%, 41%, and 39%.

Figure 13:
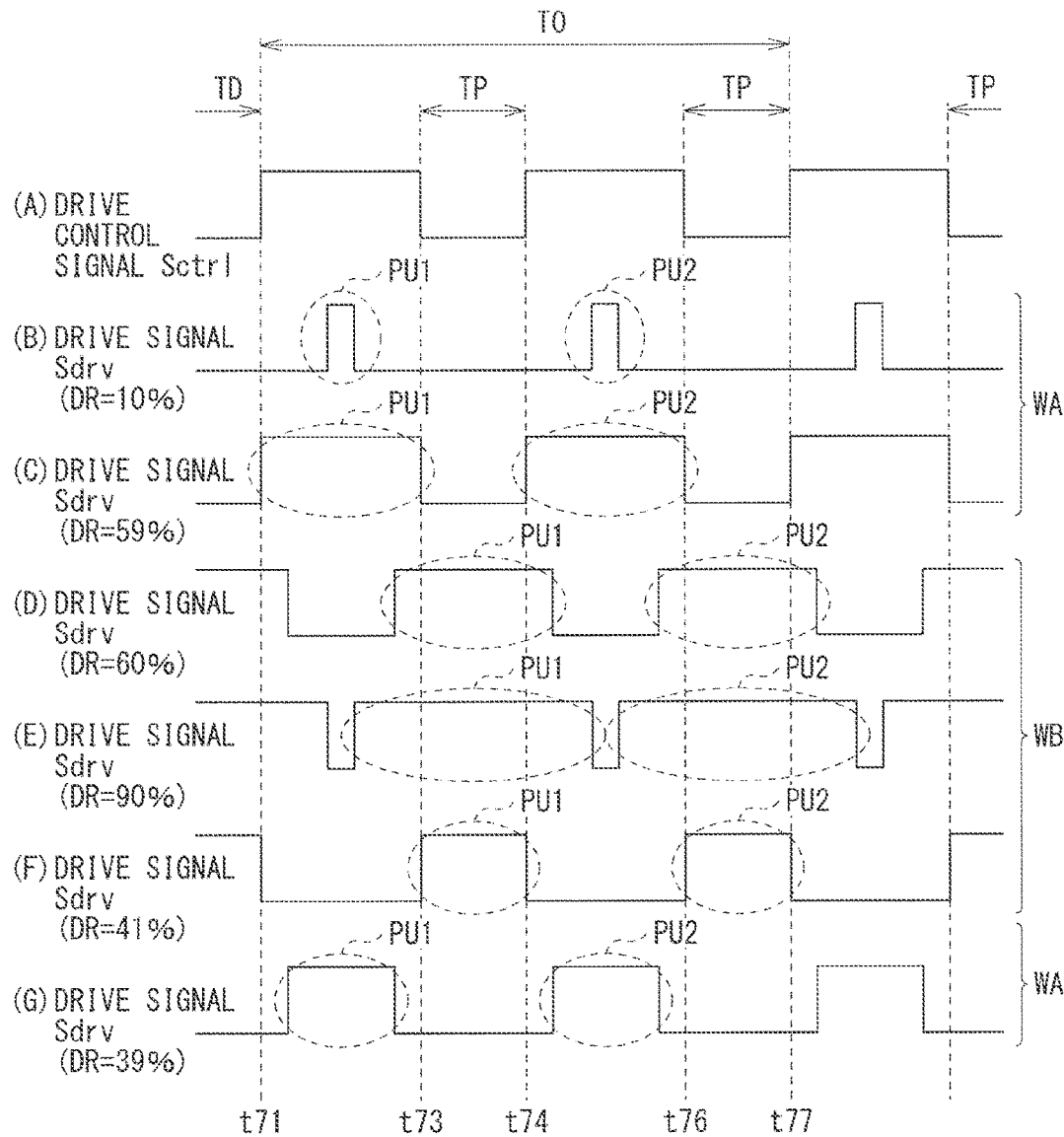
FIGS. 13(A), 13(B), 13(C), 13(D), 13(E), 13(F) and 13(G) are timing waveform charts that illustrates one operation example of a driver unit according to another modification example of the first embodiment.

First, the driver unit 20D generates the drive signal Sdrv with the duty ratio DR set at 10% (FIG. 13(B)). At this occasion, the driver unit 20D generates the drive signal Sdrv that is the low level in the P phase term TP (a term of timing t73 to t74) and in the D phase term TD (a term of timing t76 to t77). In the following, a waveform of the drive signal Sdrv as described above is called a waveform WA. Moreover, thereafter, the driver unit 20D generates the drive signal Sdrv having the waveform WA, with the duty ratio DR being set at 59% (FIG. 13(C)).

Thereafter, the driver unit 20D generates the drive signal Sdrv, with the duty ratio DR being set at 60% (FIG. 13(D)). At this occasion, the driver unit 20D allows the waveform of the drive signal Sdrv to be a waveform (hereinafter referred to as a waveform WB) that is the high level in the P phase term TP and the D phase term TD. In other words, setting the duty ratio DR of the drive signal Sdrv at 60%, with the waveform WA being maintained, causes the duty ratio DR (60%) to be higher than the duty ratio (59%) of the drive control signal Sctrl. Thus, the transition timing of each of the pulses PU1 and PU2 falls within the P phase term TP or within the D phase term TD. Accordingly, the driver unit 20D changes the waveform of the drive signal Sdrv from the waveform WA to the waveform WB. Moreover, thereafter, the driver unit 20D generates the drive signal Sdrv having the waveform WB, with the duty ratio DR being set at 90% (FIG. 13(E)). Furthermore, thereafter, the driver unit 20D generates the drive signal Sdrv having the waveform WB, with the duty ratio DR being set at 41% FIG. 13(F)).

Thereafter, the driver unit 20D generates the drive signal Sdrv, with the duty ratio DR being set at 39% (FIG. 13(G)). At this occasion, the driver unit 20D allows the waveform of the drive signal Sdrv to be the waveform WA. In other words, upon setting the duty ratio DR of the drive signal Sdrv at 39%, with the waveform WB being maintained, the transition timing of each of the pulses PU1 and PU2 falls within the P phase term TP or within the D phase term TD. Accordingly, the driver unit 20D changes the waveform of the drive signal Sdrv from the waveform WB to the waveform WA.

Figure 14:
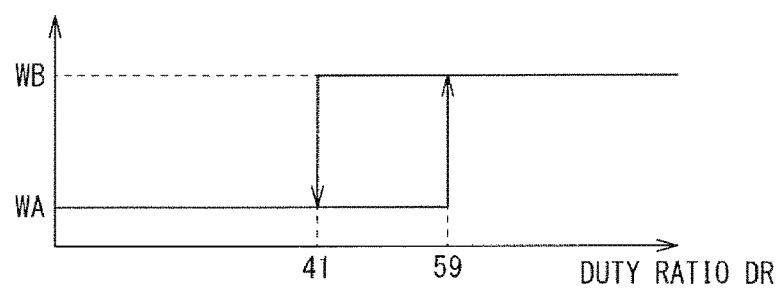
FIG. 14 is a characteristic diagram that illustrates one operation example of the driver unit illustrated in FIGS. 13(A), 13(B), 13(C), 13(D), 13(E), 13(F) and 13(G).

FIG. 14 illustrates the waveform of the drive signal Sdrv, with the duty ratio DR of the drive signal Sdrv being varied. In this example, the driver unit 20D allows the waveform of the drive signal Sdrv to be the waveform WA, in a case where the duty ratio DR is smaller than 41%. Moreover, as the duty ratio DR is increased and the duty ratio DR becomes larger than 59%, the driver unit 20D changes the waveform of the drive signal Sdrv from the waveform WA to the waveform WB. Likewise, the driver unit 20D allows the waveform of the drive signal Sdrv to be the waveform WB, in a case where, in this example, the duty ratio DR is larger than 59%. Moreover, as the duty ratio DR is decreased and the duty ratio DR becomes smaller than 41%, the driver unit 20D changes the waveform of the drive signal Sdrv from the waveform WB to the waveform WA. As described, in the driver unit 20D, a characteristic in determining the waveform of the drive signal Sdrv on the basis of the duty ratio DR of the drive signal Sdrv has a hysteresis. Accordingly, in the camera module 1D, it is possible to reduce possibility that the waveform of the drive signal Sdrv frequently switches between the waveform WA and the waveform WB, as compared to a case without such a hysteresis characteristic. This makes it possible to reduce possibility of degradation in the image quality.

Modification Example 1-5

Figure 15:
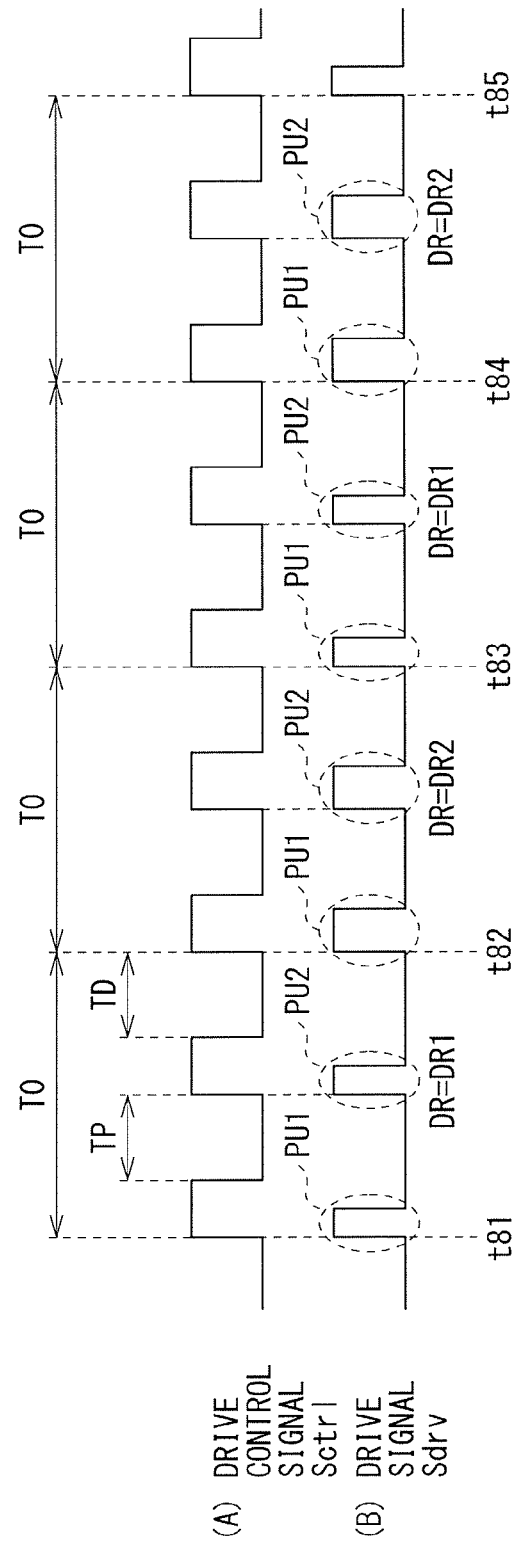
FIGS. 15(A) and 15(B) are timing waveform charts that illustrates one operation example of a driver unit according to another modification example of the first embodiment.

In the forgoing embodiment, as illustrated in, for example, FIGS. 4(A), 4(B), 4(C) and 4(D), the driver unit 20 achieves the desired duty ratio DR with the utilization of the pulses PU1 and PU2 in the single term T0. However, this is non-limiting. In one alternative, for example, as illustrated in FIGS. 15(A) and 15(B), the desired duty ratio DR may be achieved with the utilization of the pulses PU1 and PU2 in a plurality of (two in this example) the terms T0. In this example, in the term T0 of timing t81 to t82, the duty ratio DR of the drive signal Sdrv is set at a value DR1. In the term T0 of the timing t82 to t83, the duty ratio DR of the drive signal Sdrv is set at a value DR2 that is slightly larger than the value DR1. Moreover, the operation in the two terms T0 (the timing t81 to t83) is repeated. In this case, the duty ratio DR of the drive signal Sdrv becomes, equivalently, an average value of the value DR1 and the value DR2. As described, achieving the desired duty ratio DR with the utilization of the pulses PU1 and PU2 in the plurality of the terms T0 makes it possible to enhance resolution of the duty ratio DR of the drive signal Sdrv.

Moreover, in this example, the driver 22 may include a detection circuit that detects a drive current, so as to control the value DR1 and the value DR2 on the basis of a value detected. Thus, utilizing ΔΣ modulation makes it possible to set the duty ratio DR of the drive signal Sdrv with higher accuracy.

Modification Example 1-6

In the forgoing embodiment, the imaging unit 10 outputs the count value of each of the counters 53 after the D phase term TD, as the image signal Spic. However, this is non-limiting. In one alternative, for example, the counted value may be corrected, and the counted value thus corrected may be outputted as the image signal Spic. In the following, described are details of a camera module 1F according to this modification example.

Figure 16:
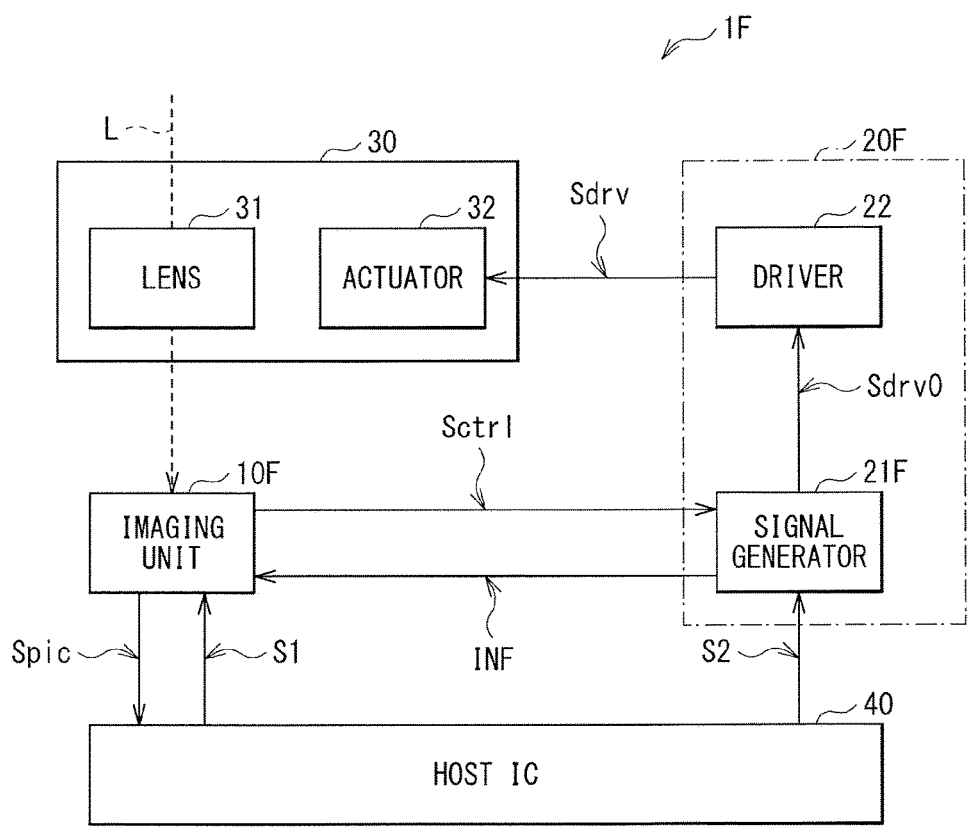
FIG. 16 is a block diagram that illustrates one configuration example of a camera module according to another modification example of the first embodiment.

FIG. 16 illustrates one configuration example of the camera module 1F. The camera module 1F includes a driver unit 20F and an imaging unit 10F. The driver unit 20F includes a signal generator 21F. The signal generator 21F generates the signal Sdrv0 on the basis of the lens control signal S2 and on the basis of the drive control signal Sctrl, as with the signal generator 21 according to the forgoing embodiment. Moreover, the signal generator 21F also has a function of supplying the imaging unit 10F with the transition timing of the signal Sdrv0 generated, as transition timing information INF.

Figure 17:
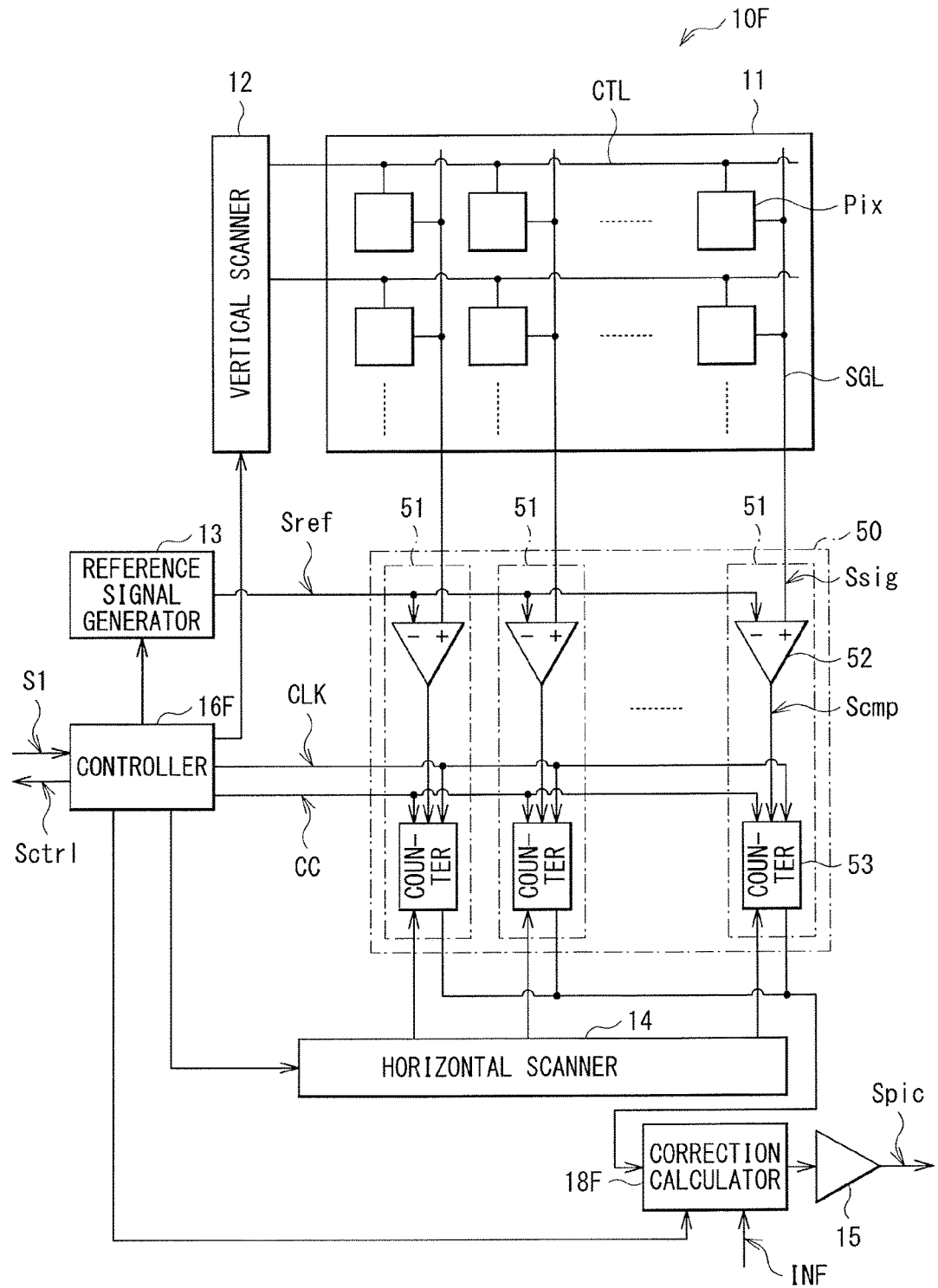
FIG. 17 is a block diagram that illustrates one configuration example of an imaging unit illustrated in FIG. 16.

FIG. 17 illustrates one configuration example of the imaging unit 10F. The imaging unit 10F includes a correction calculator 18F and a controller 16F. The controller 16F controls operation of the imaging unit 10F. The correction calculator 18F corrects the count value (CNT2−CNT1) supplied from each of the counters 53, in accordance with a level of the voltage Vsig, on the basis of the transition timing information INF. Thus, in the camera module 1F, it is possible to effect a further reduction in possibility that the pixel value PV is affected by the noise caused by the transition of the drive signal Sdrv.

In other words, in the camera module 1 according to the forgoing embodiment, the time tp and the time td are equal to each other. The time tp is the time from the last transition timing of the drive signal Sdrv before the P phase term TP to the timing of the start of the P phase term TP. The time td is the time from the last transition timing of the drive signal Sdrv before the D phase term TD to the timing of the start of the D phase term TD. Hence, it is possible to allow the noise component included in the count value CNT1 and the noise component included in the count value CNT2 to approximate to each other.

However, as illustrated in, for example, FIGS. 3(A), 3(B), 3(C), 3(D), 3(E) and 3(F), the timing t6 at which the signal Scmp makes the transition in the D phase term TD differs according to the level of the voltage Vsig. Accordingly, time from the last transition timing of the drive signal Sdrv before the P phase term TP to timing at which the signal Scmp makes the transition in the P phase term TP, and time from the last transition timing of the drive signal Sdrv before the D phase term TD to timing at which the signal Scmp makes the transition in the D phase term TD do not necessarily coincide with each other. As a result, there is possibility that the noise component included in the count value CNT1 and the noise component included in the count value CNT2 are different from each other. In this case, there is possibility that the noise component remains in the difference (CNT2−CNT1) between the count values CNT1 and the CNT2.

In the camera module 1F according to this modification example, the correction calculator 18F grasps, on the basis of the transition timing information INF, the transition timing of the drive signal Sdrv before the P phase term TP and the transition timing of the drive signal Sdrv before the D phase term TD, and corrects the count value (CNT2−CNT1) in accordance with the level of the voltage Vsig (the timing at which the signal Scmp makes the transition in the D phase term TD). This makes it possible for the correction calculator 18F to correct the count value (CNT2−CNT1) supplied from each of the counters 53, by an amount of a difference between the noise component included in the count value CNT1 and the noise component included in the count value CNT2. As a result, in the camera module 1F, it is possible to reduce the possibility that the pixel value PV is affected by the noise caused by the transition of the drive signal Sdrv.

Other Modification Examples

Moreover, two or more of these modification examples may be combined.

2. Second Embodiment

Description is given next of a camera module 2 according to a second embodiment. In this embodiment, the intervals between the P phase terms TP and the D phase terms TD are different from one another. It is to be noted that the substantially same constituent parts as those of the camera module 1 according to the forgoing first embodiment are denoted by the same reference characters, and description thereof is omitted as appropriate.

As illustrated in FIG. 1, the camera module 2 includes an imaging unit 60 and a driver unit 70. The imaging unit 60 performs the imaging operation on the basis of the imaging control signal S1, and outputs the captured images acquired, as the image signal Spic, while generating the drive control signal Sctrl, as with the imaging unit 10 according to the first embodiment. At this occasion, unlike the imaging unit 10, the imaging unit 60 performs the imaging operation, so as to allow the intervals between the P phase terms TP and the D phase terms TD to differ from one another.

The driver unit 70 includes a signal generator 71. The signal generator 71 generates the signal Sdrv0 on the basis of the lens control signal S2 and on the basis of the drive control signal Sctrl, as with the signal generator 21 according to the first embodiment. At this occasion, the signal generator 71 sets the pulse widths of the drive signal in accordance with the intervals between the P phase terms and the D phase terms.

Figure 18:
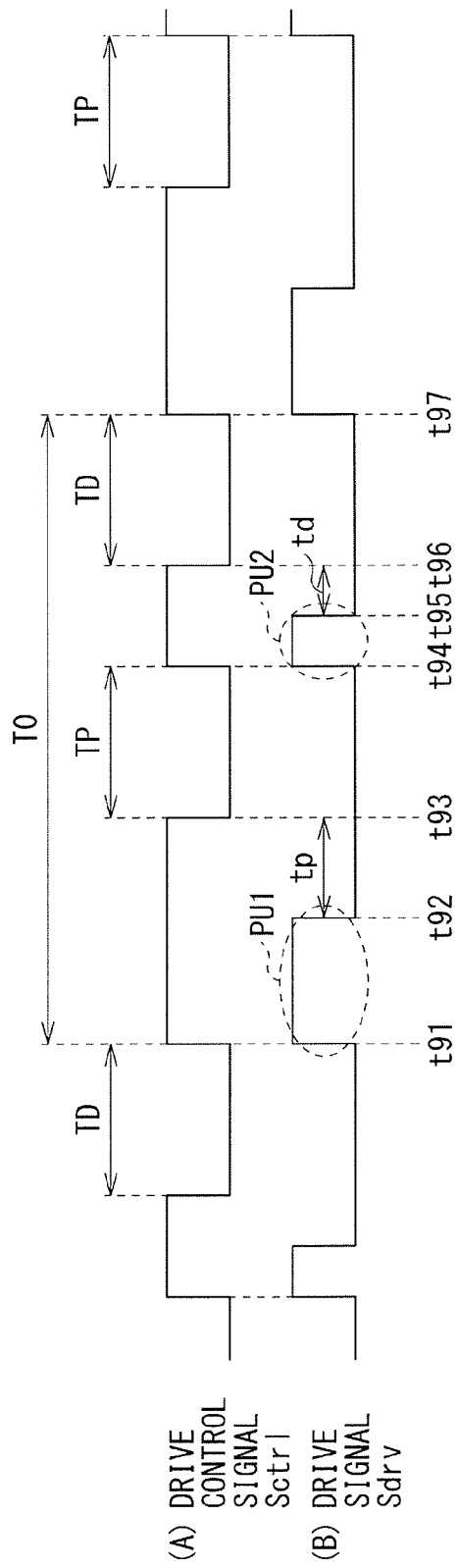
FIGS. 18(A) and 18(B) are timing waveform charts that illustrates one operation example of a driver unit according to a second embodiment.

FIGS. 18(A) and 18(B) illustrates one operation example of the driver unit 70, with (A) indicating the waveform of the drive control signal Sctrl, and with (B) indicating the waveform of the drive signal Sdrv.

The imaging unit 60 allows the drive control signal Sctrl to be the high level in a term of timing t91 to t93, and allows the drive control signal Sctrl to be the low level in a term of the timing t93 to t94 (the P phase term TP). Moreover, the imaging unit 60 allows the drive control signal Sctrl to be the high level in a term of the timing t94 to t96, and allows the drive control signal Sctrl to be the low level in a term of the timing t96 to t97 (the D phase term TD). The imaging unit 60 repeats the operation in a term of the timing t91 to t97 (the term T0). In this example, the intervals between the P phase terms TP and the D phase terms TD differ from one another. Specifically, a time width from the timing of the end of the D phase term TD (e.g., the timing t91) to the timing of the start of the P phase term TP (e.g., the timing t93) is longer than a time width from the timing of the end of the P phase term TP (e.g., the timing t94) to the timing of the start of the D phase term TD (e.g., the timing t97).

On the basis of the drive control signal Sctrl, the driver unit 70 allows the voltage of the drive signal Sdrv to change from the low level to the high level at the timing t91, to change from the high level to the low level at the timing t92, to change from the low level to the high level at the timing t94, and to change from the high level to the low level at the timing t95.

At this occasion, the driver unit 70 allows the pulse width of the pulse PU1 to be longer than the pulse width of the pulse PU2, because the time width from the timing of the end of the D phase term TD to the timing of the start of the P phase term TP is longer than the time width from the timing of the end of the P phase term TP to the timing of the start of the D phase term TD. Moreover, the driver unit 70 allows the time tp to be longer than the time td. The time tp is the time from the last transition timing of the drive signal Sdrv before the P phase term TP to the timing of the start of the P phase term TP. The time td is the time from the last transition timing of the drive signal Sdrv before the D phase term TD to the timing of the start of the D phase term TD. Thus, it is possible to allow the noise component included in the count value CNT1 acquired in the P phase term TP and the noise component included in the count value CNT2 acquired in the D phase term TD to approximate to each other.

In other words, an amount of the noise of the signal Ssig as illustrated in FIGS. 6(A) and 6(B) varies with the pulse widths of the pulses PU1 and PU2 in the drive signal Sdrv. Specifically, in a case where the pulse widths of the pulses PU1 and PU2 are large, the noise of the signal Ssig becomes large. In a case where the pulse widths of the pulses PU1 and PU2 are small, the noise of the signal Ssig becomes small. Accordingly, as illustrated in FIGS. 18(A) and 18(B), the driver unit 70 increases the pulse width of the pulse PU1 in the term of the timing t91 to t93, because the time width thereof is large, and increases the time tp from the last transition timing of the drive signal Sdrv before the P phase term TP to the timing of the start of the P phase term TP. Moreover, the driver unit 70 decreases the pulse width of the pulse PU1 in the term of the timing t94 to t96, because the time width thereof is small, and decreases the time td from the last transition timing of the drive signal Sdrv before the D phase term TD to the timing of the start of the D phase term TD. This makes it possible to allow the noise component included in the count value CNT1 acquired in the P phase term TP and the noise component included in the count value CNT2 acquired in the D phase term TD to approximate to each other. As a result, in the camera module 2, it is possible to enhance the image quality.

As described, in this embodiment, the pulse widths of the drive signal are changed in accordance with the intervals of the P phase terms and the D phase terms. Hence, it is possible to enhance the image quality.

Modification Example 2-1

Figure 19:
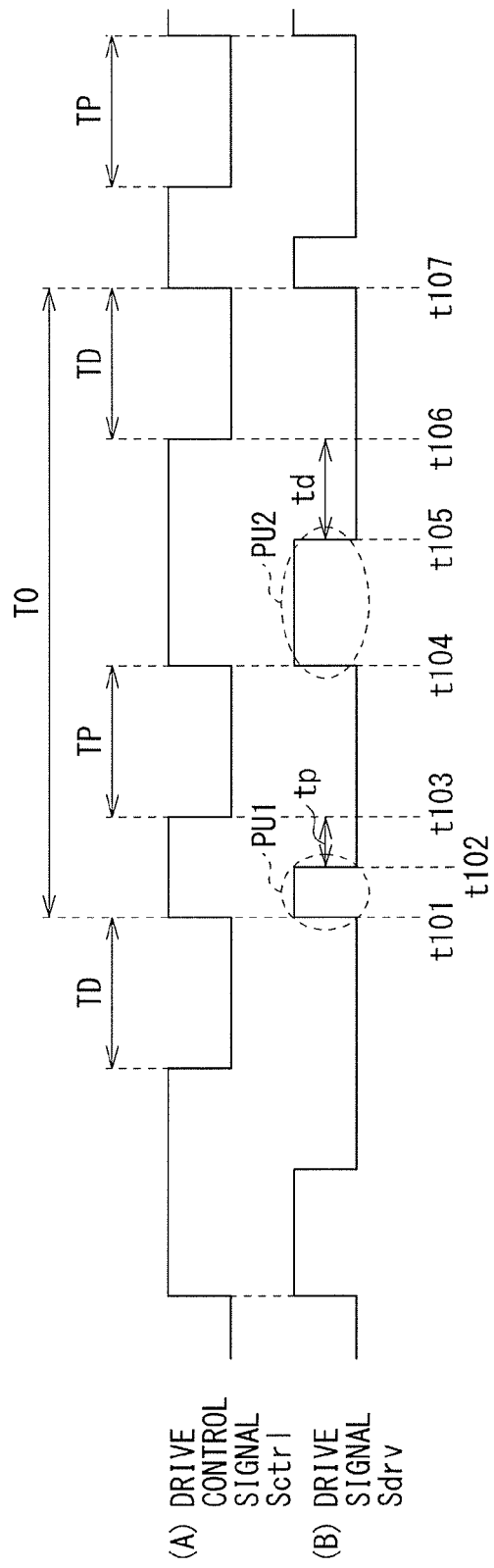
FIGS. 19(A) and 19(B) are timing waveform charts that illustrates one operation example of a driver unit according to a modification example of the second embodiment.

In the forgoing embodiment, the time width of the term of the timing t91 to t93 before the P phase term TP is longer than the time width of the term of the timing t94 to t96 before the D phase term TD. However, this is non-limiting. In one alternative, for example, as illustrated in FIGS. 19(A) and 19(B), a time width of a term of timing t104 to t106 before the D phase term TD may be longer than a time width of a term of timing t101 to t103 before the P phase term TP. In this case, the driver unit 70 allows the pulse width of the pulse PU2 to be longer than the pulse width of the pulse PU1. Moreover, the driver unit 70 allows the time td to be longer than the time tp. The time td is the time from the last transition timing of the drive signal Sdrv before the D phase term TD to the timing of the start of the D phase term TD. The time tp is the time from the last transition timing of the drive signal Sdrv before the P phase term TP to the timing of the start of the P phase term TP. With this configuration as well, it is possible to produce similar effects to those of the forgoing embodiment.

Other Modification Examples

The modification examples of the forgoing first embodiment may each be applied to the camera module 2 according to the forgoing embodiment.

3. Application Examples

Description is given next of application examples of the camera modules as described in the forgoing embodiments and the modification examples.

Figure 20A:
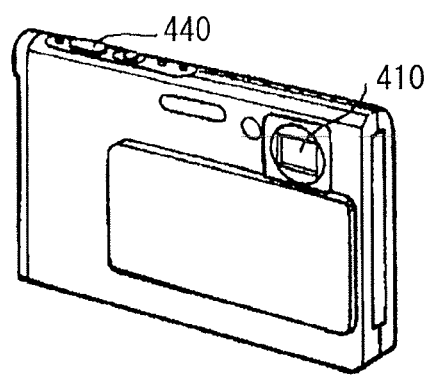
FIG. 20A is a perspective view of an appearance and a configuration of a digital camera according to an application example.
Figure 20B:
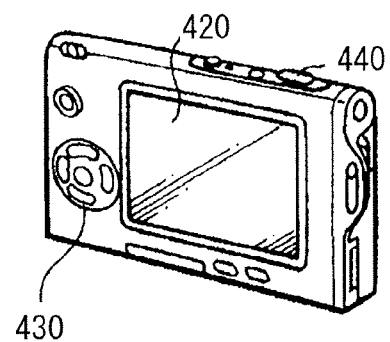
FIG. 20B is another perspective view of the appearance and the configuration of the digital camera according to the application example.

FIGS. 20A and 20B illustrate an appearance of a digital camera. FIG. 20A illustrates the appearance of the digital camera as viewed from front (from object side). FIG. 20B illustrates the appearance of the digital camera as viewed from rear (from image side). The digital camera includes, for example, a lighting unit 410 for flashlight, a display unit 420, a menu switch 430, and a shutter button 440. The camera modules as described above are applied to the digital camera.

The camera modules of the forgoing example embodiments are applicable to electronic apparatuses in diverse fields that perform the imaging operation, e.g., a smartphone, a tablet, and a camcorder, in addition to the digital camera as mentioned above. With the technology, it is possible to enhance the image quality while reducing power consumption. In particular, applying the technology to portable electronic apparatuses makes it possible to enhance the image quality while restraining heat generation.

Although description has been made by giving the embodiments, the modification examples, and the application examples to the electronic apparatuses, the contents of the technology are not limited to the above-mentioned example embodiments and may be modified in a variety of ways.

For example, in the forgoing example embodiments, the camera module 1 or 2 includes the lens unit 30, but this is non-limiting. In one alternative, the camera module may be constituted, with the lens unit omitted, so as to allow the camera module to supply the drive signal Sdrv to an external lens unit. The camera module may be applicable to, for example, a lens-interchangeable camera.

It is to be noted that effects described herein are merely exemplified. Effects of the technology are not limited to the effects described herein. Effects of the technology may further include other effects than the effects described herein.

It is to be noted that the technology may have the following configuration.

(1) A camera module, including:
an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on the basis of a difference between the first detection value and the second detection value;
a lens unit including a lens and an actuator that drives the lens; and
a driver unit that generates a drive signal and drives the actuator using the drive signal, the drive signal making a transition in each of the first term and the third term.

(2) The camera module according to (1), in which
the first term, the second term, the third term, and the fourth term are repetitively set in the order, and
a time width of the first term is equal to a time width of the third term.

(3) The camera module according to (2), in which
time from last timing of the transition of the drive signal in the first term to timing of a start of the second term is equal to time from last timing of the transition of the drive signal in the third term to timing of a start of the fourth term.

(4) The camera module according to (2) or (3), in which
the driver unit sets a duty ratio of the drive signal, for each cyclic term including the first term, the second term, the third term, and the fourth term.

(5) The camera module according to any one of (2) to (4), in which
the drive signal keeps a first level or a second level, in the second term and the fourth term.

(6) The camera module according to (5), in which
the driver unit
allows the drive signal in the second term and the fourth term to be the second level, on a condition that the duty ratio of the drive signal to be generated is larger than a first predetermined value, with the drive signal in the second term and the fourth term being the first level, and
allows the drive signal in the second term and the fourth term to be the first level, on a condition that the duty ratio of the drive signal to be generated is smaller than a second predetermined value, with the drive signal in the second term and the fourth term being the second level.

(7) The camera module according to (6), in which
the first predetermined value is larger than the second predetermined value.

(8) The camera module according to any one of (1) to (7), in which
the driver unit cyclically selects one of a plurality of duty ratios and sets a duty ratio, for each cyclic term including the first term, the second term, the third term, and the fourth term.

(9) The camera module according to (1), in which
the first term, the second term, the third term, and the fourth term are repetitively set in the order, and
a time width of the first term is different from a time width of the third term.

(10) The camera module according to (9), in which
the driver unit
sets a pulse width of the drive signal in the first term, in accordance with the time width of the first term, and
sets the pulse width of the drive signal in the third term, in accordance with the time width of the third term.

(11) The camera module according to (10), in which
the driver unit
increases the pulse width of the drive signal in the first term, as the time width of the first term is larger, and
increases the pulse width of the drive signal in the third term, as the time width of the third term is larger.

(12) The camera module according to (10) or (11), in which
the driver unit
allows the pulse width of the drive signal in the first term to be larger than the pulse width of the drive signal in the third term, on a condition that the time width of the first term is larger than the time width of the third term, and
allows the pulse width of the drive signal in the third term to be larger than the pulse width of the drive signal in the first term, on a condition that the time width of the third term is larger than the time width of the first term.

(13) The camera module according to any one of (10) to (12), in which
the driver unit
increases time from last timing of the transition of the drive signal in the first term to timing of a start of the second term, as the time width of the first term is larger, and
increases time from last timing of the transition of the drive signal in the third term to the timing of a start of the fourth term, as the time width of the third term is larger.

(14) The camera module according to any one of (1) to (13), further including a correction unit that corrects the pixel value on the basis of timing of the transition of the drive signal, in which
the imaging unit includes a counter, and obtains the first detection value and the second detection value on the basis of a count value of the counter.

(15) The camera module according to any one of (1) to (14), in which
the imaging unit includes:
a ramp signal generator that generates a ramp signal in the second term and the fourth term;
a comparator that makes a comparison of the ramp signal with a signal supplied from the relevant one of the pixels, in the second term and the fourth term; and
a counter that obtains time from timing of generation of the ramp signal to a change in a result of the comparison in the comparator, to obtain the first detection value and the second detection value.

(16) A camera module, including:
an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on the basis of a difference between the first detection value and the second detection value; and
a driver unit that generates a drive signal and supplies the drive signal to an actuator that drives a lens, the drive signal making a transition in each of the first term and the third term.

(17) An electronic apparatus, including:
a camera module that captures an image; and
a processor that performs processing on the basis of the image captured by the camera module,
the camera module including
an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on the basis of a difference between the first detection value and the second detection value,
a lens unit including a lens and an actuator that drives the lens, and
a driver unit that generates a drive signal and drives the actuator using the drive signal, the drive signal making a transition in each of the first term and the third term.

This application claims the benefit of Japanese Priority Patent Application JP2015-71430 filed on Mar. 31, 2015, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A camera module, comprising:
an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on a basis of a difference between the first detection value and the second detection value;
a lens unit including a lens and an actuator that drives the lens; and
a driver unit that generates a drive signal and drives the actuator using the drive signal, the drive signal making a transition in each of the first term and the third term.

2. The camera module according to claim 1, wherein
the first term, the second term, the third term, and the fourth term are repetitively set in the order, and
a time width of the first term is equal to a time width of the third term.

3. The camera module according to claim 2, wherein
time from last timing of the transition of the drive signal in the first term to timing of a start of the second term is equal to time from last timing of the transition of the drive signal in the third term to timing of a start of the fourth term.

4. The camera module according to claim 2, wherein
the driver unit sets a duty ratio of the drive signal, for each cyclic term including the first term, the second term, the third term, and the fourth term.

5. The camera module according to claim 2, wherein
the drive signal keeps a first level or a second level, in the second term and the fourth term.

6. The camera module according to claim 5, wherein
the driver unit
allows the drive signal in the second term and the fourth term to be the second level, on a condition that the duty ratio of the drive signal to be generated is larger than a first predetermined value, with the drive signal in the second term and the fourth term being the first level, and
allows the drive signal in the second term and the fourth term to be the first level, on a condition that the duty ratio of the drive signal to be generated is smaller than a second predetermined value, with the drive signal in the second term and the fourth term being the second level.

7. The camera module according to claim 6, wherein
the first predetermined value is larger than the second predetermined value.

8. The camera module according to claim 1, wherein
the driver unit cyclically selects one of a plurality of duty ratios and sets a duty ratio, for each cyclic term including the first term, the second term, the third term, and the fourth term.

9. The camera module according to claim 1, wherein
the first term, the second term, the third term, and the fourth term are repetitively set in the order, and
a time width of the first term is different from a time width of the third term.

10. The camera module according to claim 9, wherein
the driver unit
sets a pulse width of the drive signal in the first term, in accordance with the time width of the first term, and
sets the pulse width of the drive signal in the third term, in accordance with the time width of the third term.

11. The camera module according to claim 10, wherein
the driver unit
increases the pulse width of the drive signal in the first term, as the time width of the first term is larger, and
increases the pulse width of the drive signal in the third term, as the time width of the third term is larger.

12. The camera module according to claim 10, wherein
the driver unit
allows the pulse width of the drive signal in the first term to be larger than the pulse width of the drive signal in the third term, on a condition that the time width of the first term is larger than the time width of the third term, and
allows the pulse width of the drive signal in the third term to be larger than the pulse width of the drive signal in the first term, on a condition that the time width of the third term is larger than the time width of the first term.

13. The camera module according to claim 10, wherein
the driver unit
increases time from last timing of the transition of the drive signal in the first term to timing of a start of the second term, as the time width of the first term is larger, and
increases time from last timing of the transition of the drive signal in the third term to the timing of a start of the fourth term, as the time width of the third term is larger.

14. The camera module according to claim 1, further comprising a correction unit that corrects the pixel value on a basis of timing of the transition of the drive signal, wherein the imaging unit includes a counter, and obtains the first detection value and the second detection value on a basis of a count value of the counter.

15. The camera module according to claim 1, wherein
the imaging unit includes:
a ramp signal generator that generates a ramp signal in the second term and the fourth term;
a comparator that makes a comparison of the ramp signal with a signal supplied from the relevant one of the pixels, in the second term and the fourth term; and
a counter that obtains time from timing of generation of the ramp signal to a change in a result of the comparison in the comparator, to obtain the first detection value and the second detection value.

16. A camera module, comprising:
an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on a basis of a difference between the first detection value and the second detection value; and
a driver unit that generates a drive signal and supplies the drive signal to an actuator that drives a lens, the drive signal making a transition in each of the first term and the third term.

17. An electronic apparatus, comprising:
a camera module that captures an image; and
a processor that performs processing on a basis of the image captured by the camera module,
the camera module including
an imaging unit that includes a plurality of pixels, acquires a first detection value in one of the pixels in a second term out of a first term, the second term, a third term, and a fourth term that are set in order, acquires a second detection value in the relevant one of the pixels in the fourth term, and obtains a pixel value of the relevant one of the pixels on a basis of a difference between the first detection value and the second detection value,
a lens unit including a lens and an actuator that drives the lens, and
a driver unit that generates a drive signal and drives the actuator using the drive signal, the drive signal making a transition in each of the first term and the third term.

* * * * *